(12) United States Patent
Aoyama et al.

(10) Patent No.: US 7,971,599 B2
(45) Date of Patent: Jul. 5, 2011

(54) AIR-OPERATED VALVE

(75) Inventors: Tatsuhito Aoyama, Komaki (JP); Katsunori Hirose, Komaki (JP); Takashi Yajima, Komaki (JP); Tadaichi Hamada, Komaki (JP)

(73) Assignee: CKD Corporation, Komaki-shi (JP)

( * ) Notice: Subject to any disclaimer, the term of this patent is extended or adjusted under 35 U.S.C. 154(b) by 1079 days.

(21) Appl. No.: 11/802,217

(22) Filed: May 21, 2007

(65) Prior Publication Data

US 2007/0290154 A1    Dec. 20, 2007

(30) Foreign Application Priority Data

Jun. 20, 2006 (JP) ................................. 2006-170425
Dec. 7, 2006 (JP) ................................. 2006-331033
Dec. 7, 2006 (JP) ................................. 2006-331044

(51) Int. Cl.
*F16K 27/04* (2006.01)
(52) U.S. Cl. .................. 137/270; 251/63.5; 251/331
(58) Field of Classification Search ............... 251/63, 251/62, 63.5, 63.6, 331, 335.2; 137/553, 137/270

See application file for complete search history.

(56) References Cited

U.S. PATENT DOCUMENTS

| | | | | |
|---|---|---|---|---|
| 3,122,065 A | * | 2/1964 | Laun | 137/270 |
| 3,485,141 A | * | 12/1969 | Ott et al. | 91/533 |
| 4,596,267 A | * | 6/1986 | Tosseghini | 137/270 |
| 4,840,347 A | * | 6/1989 | Ariizumi et al. | 251/63.4 |
| 5,108,069 A | * | 4/1992 | Tada et al. | 251/58 |
| 5,853,022 A | * | 12/1998 | Eggleston et al. | 137/270 |
| 6,189,861 B1 | * | 2/2001 | Gotch et al. | 251/331 |
| 6,244,563 B1 | * | 6/2001 | Ejiri | 251/63.6 |
| 6,371,257 B1 | * | 4/2002 | Connolly | 188/72.4 |
| 6,742,763 B2 | * | 6/2004 | Kremer | 251/112 |

FOREIGN PATENT DOCUMENTS

| | | |
|---|---|---|
| JP | U-38-23205 | 11/1963 |
| JP | A-55-105608 | 7/1980 |
| JP | U-55-105608 | 7/1980 |
| JP | A-62-009711 | 1/1987 |
| JP | U-62-009711 | 1/1987 |
| JP | U-62-041981 | 3/1987 |
| JP | U-62-159231 | 10/1987 |
| JP | A-63-083477 | 4/1988 |
| JP | A-63-88387 | 4/1988 |
| JP | A-64-007904 | 1/1989 |
| JP | U-64-007904 | 1/1989 |
| JP | A-4-181079 | 6/1992 |
| JP | U-5-47402 | 6/1993 |
| JP | A-7-208630 | 8/1995 |
| JP | A-10-035525 | 2/1998 |
| JP | A-10-061609 | 3/1998 |
| JP | A-11-325303 | 11/1999 |
| JP | A-2001-027352 | 1/2001 |
| JP | A-2001-50414 | 2/2001 |

(Continued)

*Primary Examiner* — John K Fristoe, Jr.
*Assistant Examiner* — Andrew J Rost
(74) *Attorney, Agent, or Firm* — Oliff & Berridge, PLC

(57) ABSTRACT

To provide a low-cost air-operated valve, an air-operated valve comprises a piston, a cylinder in which the piston is allowed to slide by operation air, and a valve section to be driven by sliding movement of the piston. The cylinder includes an outer member having a hollow portion and an inner member loaded in the hollow portion of the outer member to define a piston chamber in which the piston is allowed to slide.

4 Claims, 30 Drawing Sheets

FOREIGN PATENT DOCUMENTS

| | | |
|---|---|---|
| JP | A-2001-65716 | 3/2001 |
| JP | A-2001-200943 | 7/2001 |
| JP | A-2001-213338 | 8/2001 |
| JP | A-2002-070807 | 3/2002 |
| JP | A-2002-147410 | 5/2002 |
| JP | A 2004-92824 | 3/2004 |
| JP | A-2004-100889 | 4/2004 |
| JP | A 2005-214231 | 8/2005 |
| JP | A-2006-125416 | 5/2006 |

* cited by examiner

AIR-OPERATED VALVE

BACKGROUND OF THE INVENTION

1. Field of the Invention

The present invention relates to an air-operated valve with a piston slidable in a cylinder by operation air to activate a valve section.

2. Description of Related Art

As an air-operated valve arranged to activate a valve section by sliding a piston in a cylinder by operation air, there is for example an air-operated valve 1100 as shown in FIG. 31.

The air-operated valve 1100 includes, in outer shape or appearance, an actuator section 1110 attached to a body 1101, and further a hand-operated mechanism 1120 attached to the actuator section 1110 for forcibly actuating the actuator section 1110.

The body 1101 is formed with a valve seat 1104 between a primary-side passage 1102 and a secondary-side passage 1103. A diaphragm 1105 is placed with its outer edge clasped between the body 1101 and a holder 1106 while an adaptor 1107 is threadedly engaged in the body 1101 with the holder 1106 intervening therebetween. A stem 1108 is slidably mounted in the holder 1106 and held in contact with a backpressure side of the diaphragm 1105. The actuator section 1110, which is threadedly engaged in the adaptor 1107 so that a center rod 1118 abuts on the stem 1108, is coupled to the body 1101.

Parts or components of the actuator section 1110, except for O-rings, are made of rigid metal such as stainless steel for ensuring pressure resistance to operation air. The actuator section 1110 includes a hollow base 1111 and a cap 1112 which are threadably connected to each other to constitute a cylinder. Those base 1111 and cap 1112 hold a partition plate 1113 therebetween, thereby defining a first piston chamber 1114 and a second piston chamber 1115 partitioned by the partition plate 1113. In the first and second piston chambers 1114 and 1115, first and second pistons 1116 and 1117 are slidably mounted respectively, forming hermetically divided pressure chambers 1114a, 1115a and backpressure chambers 1114b, 1115b.

The center rod 1118 is disposed passing through the first piston 1116, the partition plate 1113, and the second piston 1117 and fixed to the first and second pistons 1116, 1117 respectively. In the backpressure chamber 1114b of the first piston chamber 1114, a compression spring 1119 is set in compressed form so that its resilient (or elastic) force acts on the stem 1108 through the first piston 1116 and the center rod 1118 to bring the diaphragm 1105 into contact with the valve seat 1104.

The center rod 1118 has a main flow passage 1118a bored therein extending from an upper surface to a middle point along a central axis of the center rod 1118, and branch passages 1118b, 1118c formed extending perpendicular to the main flow passage 1118a. The branch passages 1118b, 1118c are so formed as to communicate with the pressure chambers 1114a, 1115a respectively. An upper end of the center rod 1118 is placed in an air supply and exhaust passage 1112b formed in the cap 1112 to allow operation air to be supplied to the pressure chambers 1114a, 1115a via the flow passages 1118a, 1118b, and 1118c of the center rod 1118 or to be discharged from the pressure chambers 1114a, 1115a. On the other hand, the cap 1112 is formed with a first breathing hole 1112a communicating with the backpressure chamber 1114b. The base 1111 is formed with a second breathing hole 1111a communicating with the backpressure chamber 1115b. Accordingly, in the actuator section 1110, the center rod 1118 is caused to move upward and downward in the figure in accordance with balance between the resilient force of the compression spring 1119 and the pressure of the operation air acting on the pressure chambers 1114a, 1115a.

In the air-operated valve 1100 having the above configuration, while no operation air is supplied to the air supply and exhaust passage 1112b, the resilient force of the compression spring 1119 acts on the diaphragm 1105 through the first piston 1116, center rod 1118, and stem 1108 to hold the diaphragm 1105 in contact with the valve seat 1104. In this case, a control fluid supplied to the primary-side passage 1102 is blocked from flowing in the secondary-side passage 1103 via the valve seat 1104.

When the operation air is supplied to the air supply and exhaust passage 1112b and the inner pressures of the pressure chambers 1114a, 1115a exceed the resilient force of the compression spring 1119, the center rod 1118 is moved upward in the figure away from the stem 1108. Accordingly, the diaphragm 1105 is not pressed toward the valve seat and thus moves away from the valve seat 1104 by its own reaction force. When the control fluid is then supplied to the primary-side passage 1102, the control fluid is permitted to flow from the primary-side passage 1102 to the secondary-side passage 1103 via the valve seat 1104.

Thereafter, when the operation air is discharged from the pressure chambers 1114a, 1115b respectively through the air supply and exhaust passage 1112b, the inner pressures of the pressure chambers 1114a, 1115b is reduced below the resilient force of the compression spring 1119, allowing the center rod 1118 to move downward. The center rod 1118 presses the diaphragm 1105 through the stem 1108 toward the valve seat, thus bringing the diaphragm 1105 into contact with the valve seat 1104. This interrupts the flow passage, blocking the control fluid from flowing from the primary-side passage 1102 to the secondary-side passage 1103 via the valve seat 1104.

The above conventional valve is disclosed in for example JP2005-214231A.

SUMMARY OF THE INVENTION

In the conventional air-operated valve 1100, the cylinder is constituted of the base 1111 and the cap 1112 both made of rigid metal and engaged with each other. These base 1111 and cap 1112 have to be machined to form large hollow portions for the first and second piston chambers 1114, 1115. If the sliding surfaces along which the first and second pistons 1116, 1117 slide are rough, the O-rings attached to the first and second pistons 1116, 1117 may be damaged, leading to leakage of the operation air from the pressure chambers 1114a, 1115a into the backpressure chambers 1114b, 1115b. To avoid such damages, the base 1111 and the cap 1112 have to be machined to form the respective sliding surfaces with improved surface roughness. The conventional air-operated valve 1100 requires many cutting works to the base 1111 and the cap 1112 made of metal ensuring pressure resistance, which would cause wasteful consumption of metal materials and high costs.

The present invention has been made to solve the above problems and has an object to provide a low-cost air-operated valve.

To achieve the above object, the present invention provides an air-operated valve comprising a piston, a cylinder in which the piston is allowed to slide by operation air, and a valve section to be driven by sliding movement of the piston, wherein the cylinder includes: an outer member having a hollow portion; and an inner member loaded in the hollow portion of the outer member, defining a piston chamber in which the piston is allowed to slide.

The air-operated valve configured as above has the function of a cylinder including the function of causing a piston to slide and the structural function of ensuring pressure resistance to operation air. Specifically, the air-operated valve comprises the inner member that serves as a member having the former function and the outer member that serves as a member having the latter function. Thus, the inner member formed with the piston chambers correspondingly has a more complicated construction than the outer member. According to the air-operated valve, therefore, the outer member and the inner member are made of different materials according to respective intended use, thereby achieving a reduction in cost.

DETAILED DESCRIPTION OF THE PREFERRED EMBODIMENTS

A detailed description of preferred embodiments of an air-operated valve embodying the present invention will now be given referring to the accompanying drawings.

First Embodiment

Figure 1:
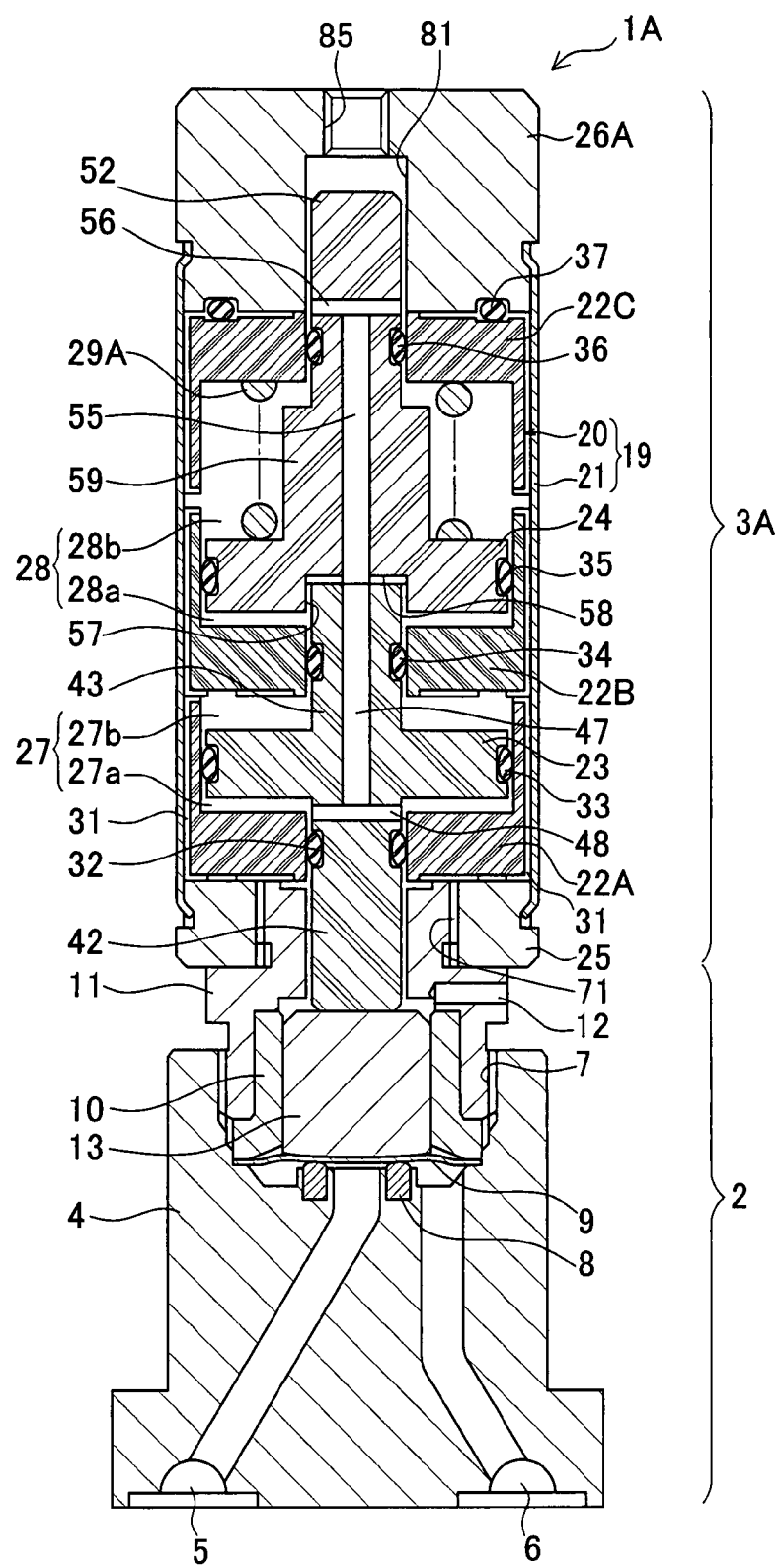
FIG. 1 is a sectional view of an air-operated valve of a first embodiment according to the present invention.
Figure 2:
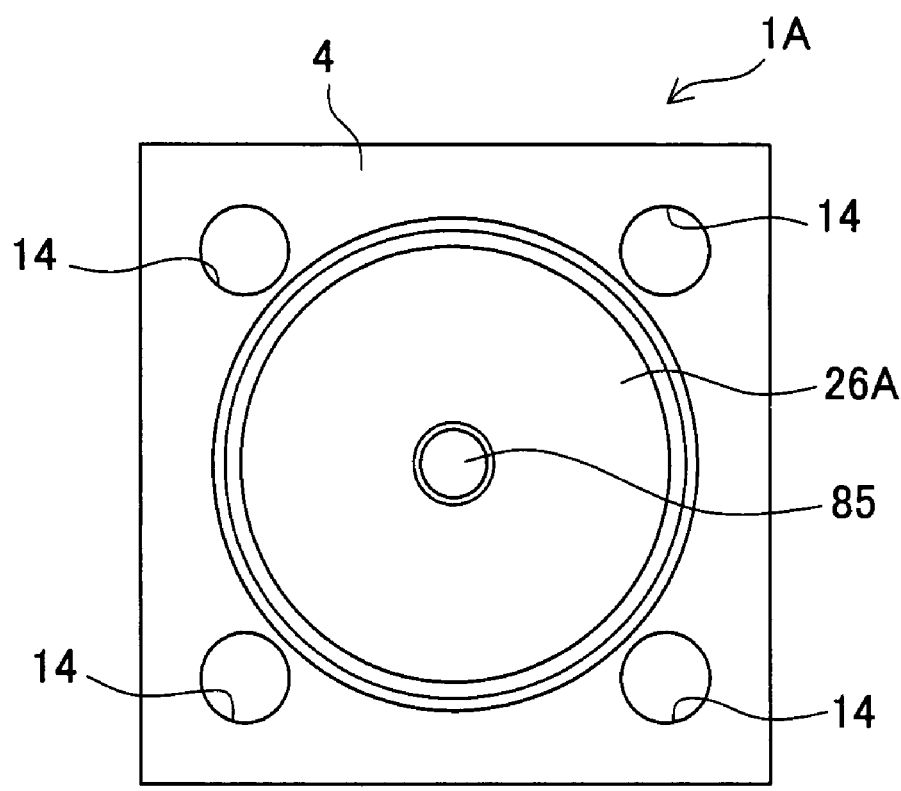
FIG. 2 is a plan view of the air-operated valve of FIG. 1.

A first embodiment of the air-operated valve of the present invention is first explained. FIG. 1 is a sectional view of an air-operated valve 1A of the first embodiment. FIG. 2 is a plan view of the air-operated valve of FIG. 1.

The air-operated valve 1A of the first embodiment includes a cylinder 19 arranged such that an inner member 20 including a plurality of inner parts 22A, 22B, 22C is loaded in an outer member 21 whose both open ends are closed by a base 25 which is an example of a "second closing plate" and a cap 26A which is an example of a "first closing plate" respectively. Thus, the cylinder 19 has a double walled construction formed by the outer member 21 and the inner member 20.

<Overall Construction>

As shown in FIG. 1, the air-operated valve 1A of the first embodiment includes a valve section 2 for controlling control fluid and an actuator section 3A for exerting a driving force to the valve section 2. In the air-operated valve 1A, the actuator section 3A is coupled to a body 4 by use of an adaptor 11, providing a cylindrical outer shape.

The valve section 2 is built in the body 4 of a cylindrical shape made of a metal material having rigidity and heat resistance such as stainless steel and aluminum. In the lower surface of the body 4, a primary-side port 5 and a secondary-side port 6 are provided. In the upper surface of the body 4, on the other hand, a cylindrical mounting hole 7 is formed. An annular valve seat 8 is centrally placed on the bottom of the mounting hole 7. The primary-side port 5 and the secondary-side port 6 are allowed to communicate with each other via the valve seat 8.

In the valve section 2, a diaphragm 9 is set in the mounting hole 7 of the body 4 and the outer edge of the diaphragm 9 is held down by a holder 10. Specifically, the adaptor 11 inserted between the inner surface of the mounting hole 7 and the outer surface of the holder 10 is screwed in the body 4, tightly holding the outer edge of the diaphragm 9 between the body 4 and the holder 10. The diaphragm 9 is made of resin or metal in a thin film shape so as to be deformable. The holder 10 and the adaptor 11 are made of a metal material having heat resistance and rigidity. In the holder 10, a metal stem 13 is fitted in contact with the diaphragm 9 to transmit the driving force of the actuator section 3A to the diaphragm 9 through the stem 13.

The actuator section 3A has a cylindrical outer shape as shown in FIGS. 1 and 2. As shown in FIG. 1, the actuator section 3A has a normally closed air cylinder construction. In the actuator section 3A, the cylinder 19 housing pistons 23, 24 which are examples of "first and second pistons" is constituted of a plurality of separate parts or components, namely, the outer member 21, the inner parts 22A, 22B, 22C, the base 25, and the cap 26A.

In the actuator section 3A, the inner parts 22A, 22B, 22C and the pistons 23, 24 are alternately loaded as shown in FIG. 1 in the pipe-shaped outer member 21. The base 25 and the cap 26A are attached to both open ends of the outer member 21 to hold the inner parts 22A, 22B, 22C between the base 25 and the cap 26A. Thus, the cylinder 19 has a double walled construction. The inner parts 22A, 22B, 22C are fixed in stacked relation in the outer member 21 to define a first piston chamber 27 and a second piston chamber 28. The pistons 23, 24 are slidably loaded in the first and second piston chambers 27, 28 respectively, thereby partitioning the first piston chamber 27 into a pressure chamber 27a and a backpressure chamber 27b and the second piston chamber 28 into a pressure chamber 28a and a backpressure chamber 28b. In the backpressure chamber 28b of the second piston chamber 28, a compression spring 29A which is an example of an "urging member" is set in compressed form to constantly urge the pistons 23, 24 downward in the figure toward the valve seat 8 (in the direction of the valve seat).

The cylinder 19 of the actuator section 3A is constructed as above of a combination of separate parts or components, i.e., the outer member 21, the inner parts 22A, 22B, 22C, the pistons 23, 24, the base 25, and the cap 26A. The actuator section 3A is fixed to the body through the adaptor 11. Accordingly, the pistons 23, 24 may not be placed coaxially with the valve seat 8 due to variations in part size or in assembly work, but the pistons 23, 24 will transmit the driving force to the diaphragm 9 through the cylindrical stem 13. To be specific, even where the piston 23 comes into contact with a slightly off-center portion of the stem 13, the driving force can be transmitted to the diaphragm 9 in dispersed manner through the stem 13 brought in surface contact with the diaphragm 9. This makes it possible to hold the diaphragm 9 into close contact with the valve seat 8 by a circumferentially uniform force.

Operation air is supplied to or discharged from the aforementioned air-operated valve 1A through an air supply and exhaust port 85 centrally formed opening on the upper surface of the cap 26A. This supply and exhaust port 85 communicates with the pressure chambers 27a, 28a of the first and second piston chambers 27, 28 through inner passages (mentioned later) formed in the pistons 23, 24. Further, the air-operated valve 1A is formed with a plurality of conducting passages 31 between the inner surface of the outer member 21 and the outer surfaces of the inner parts 22A, 22B, 22C for providing communication between the backpressure chambers 27b, 28b of the first and second piston chambers 27, 28 and a breathing hole 12 formed in the adaptor 11. Accordingly, in the air-operated valve 1A, the pistons 23, 24 can be moved axially in response to the balance between the resilient force (reaction force, or restoring force) of the compression spring 29A and the inner pressures of the pressure chambers 27a, 28a, thereby transmitting the driving force to the valve section 2.

<Configuration of Piston>

Figure 3:
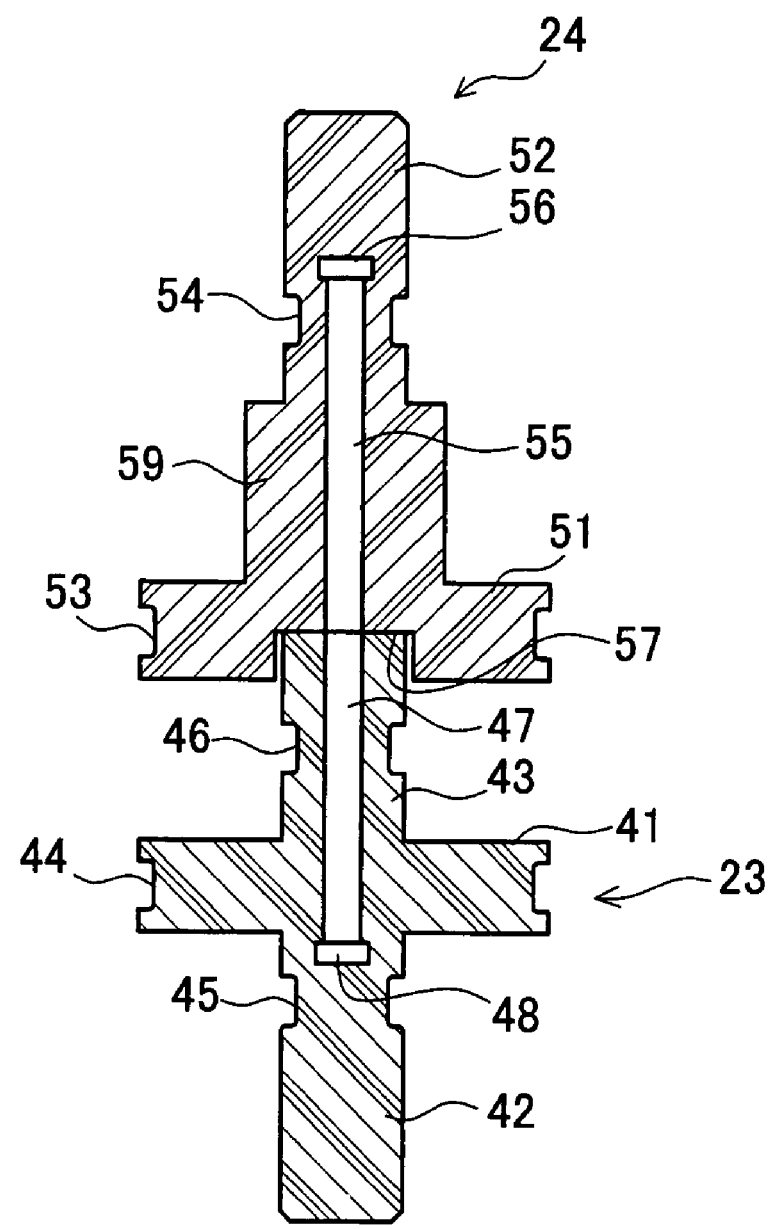
FIG. 3 is a longitudinal sectional view of first and second pistons shown in FIG. 1.

FIG. 3 is a longitudinal sectional view of the first and second pistons 23, 24 of FIG. 1.

The pistons 23, 24 are resin molded parts made of heat-resistive and light-weight resin by injection molding, such as PPS (polyphenylene sulfide), PBT (polybutylene terephthalate), POM (polyacetal), PA (polyamide), PVDF (polyvinylidene fluoride).

The piston 23 is an integrally-molded component including a piston portion 41, a piston rod 42 which is an example of a "first piston rod", and a piston rod 43. The piston portion 41 has a cylindrical shape having an outer diameter almost equal to an inner diameter of each inner part 22A, 22B, and 22C. The piston portion 41 is circumferentially formed with a mounting groove 44 on the outer periphery for receiving a seal member 33 (see FIG. 1) such as an O-ring made of an elastic material, e.g., rubber or resin. The piston rods 42, 43 are also circumferentially formed with mounting grooves 45, 46 on respective outer peripheries for receiving seal members 32, 34 (see FIG. 1) such as O-rings made of an elastic material, e.g., rubber or resin.

The piston 23 is provided with an inner passage formed in T-shape including a main passage 47 forming part of a "bypass passage" and a branch passage 48 which is an example of a "first branch passage". The main passage 47 is formed axially extending from the center of the end face of the piston rod 43 to the branch passage 48. The branch passage 48 is formed in a position of the piston rod 42 corresponding to the pressure chamber 27a and between the mounting groove 45 and a proximal end of the piston rod 42 continuous with the piston portion 41, and also the branch passage 48 is formed extending through the piston rod 42 in its diametrical direction. The branch passage 48 has a rectangular section larger in horizontal width than in vertical height.

On the other hand, the piston 24 is an integrally-molded component including a piston portion 51 and a piston rod 52 which is an example of a "second piston rod". The piston portion 51 has a cylindrical shape having an outer diameter almost equal to an inner diameter of each inner part 22A, 22B, and 22C. The piston portion 51 is circumferentially formed with a mounting groove 53 on the outer periphery for receiving a seal member 35 (see FIG. 1) such as an O-ring made of an elastic material, e.g., rubber or resin. The piston rod 52 is substantially identical in shape to the piston rod 42. The piston rod 52 is also circumferentially formed with a mounting groove 54 on the outer periphery for receiving a seal member 36 (see FIG. 1) such as an O-ring made of an elastic material, e.g., rubber or resin.

As shown in FIGS. 1 and 3, the piston 24 is provided with an inner passage formed in T-shape including a main passage 55 forming part of the "bypass passage" and a branch passage 56 which is an example of a "second branch passage". The main passage 55 is formed axially extending from the center of the end face of the piston portion 51 to the branch passage 56. The branch passage 56 is formed in a position corresponding to an insertion hole 81 of the cap 26A and closer to a distal end (an upper end) of the piston rod 52 than the mounting groove 54. Accordingly, a distance between the branch passage 56 and the piston portion 51 of the piston 24 is longer than a distance between the branch passage 48 and the piston portion 41 of the piston 23. The branch passage 56 is formed extending through the piston rod 52 in its diametrical direction. The branch passage 56 has a rectangular section larger in horizontal width than in vertical height.

The piston 24 is further provided with a fitting recess 57 around an open end of the main passage 55 so as to be concentric with the main passage 55. Communication passages 58 are radially formed in the bottom wall of the fitting recess 57 to allow part of operation air flowing in the main passage 55 to flow in the fitting recess 57.

The piston 24 further includes a guide portion 59 formed continuous with a proximal end of the piston rod 52 and larger in diameter than the piston rod 52. This guide portion 59 is inserted in the compression spring 29A to support stable expansion and contraction of the compression spring 29A in an axial direction.

The above pistons 23, 24 are coupled to each other with the piston rod 43 of the piston 23 engaging the fitting recess 57 of the piston 24 so that the end face of the piston 23 is held in contact with the bottom surface of the fitting recess 57, providing communication between the main passage 55 of the piston 24 and the main passage 47 of the piston 23.

The parts or components constituting the cylinder 19 of the air-operated valve 1A are explained below.

<Configurations of Inner Parts>

The inner parts 22A, 22B, 22C shown in FIG. 1 are resin molded components made of heat-resistive and rigid resin by injection molding, such as PPS, PBT, POM, PA, and PVDF. The inner parts 22A, 22B, 22C are identical in shape, and therefore only the inner part 22B is described below for sake of simplicity without repeating respective explanations of the other inner parts 22A, 22C.

As shown in FIG. 1, the inner part 22B is formed in a cup shape having a cylindrical peripheral wall with an open end and a closed end (a closed end wall). The inner part 22B is designed to have the outer diameter almost equal to the inner diameter of the outer member 21 and the inner diameter of the peripheral wall almost equal to the outer diameter of the piston 51. The peripheral wall of the inner part 22B is held in contact with the inner surface of the outer member 21 when the inner part 22B is loaded in the outer member 21, and therefore the peripheral wall is formed to be thin. On the other hand, the closed end (wall) of the inner part 22B serves as a partition plate that divides a hollow portion of the outer member 21 into the first and second piston chambers 27, 28 when the inner part 22B is loaded in the outer member 21. Thus the closed end wall is formed to be thick to ensure the pressure resistance to operation air.

Figure 4:
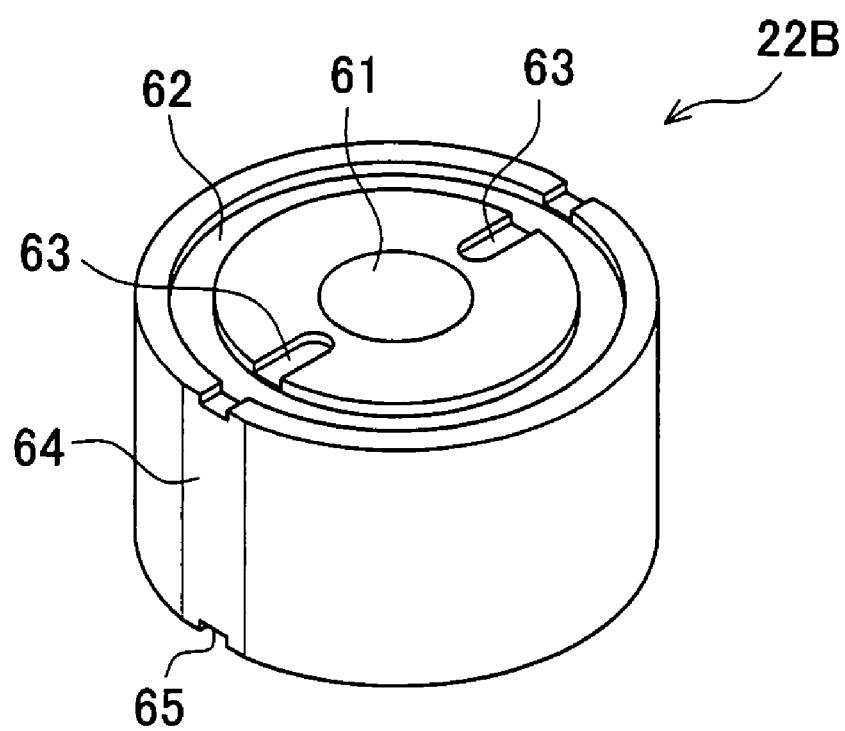
FIG. 4 is a perspective external view of an inner part.

FIG. 4 is a perspective external view of the inner part 22B, which is in an upside-down orientation from that shown in FIG. 1.

The inner part 22B is provided, centrally in the closed end wall, with a through hole 61 through which the piston rod 43 of the piston 23 (or the piston rod 42 or 52 in the case of the inner part 22A or 22C) is inserted. An annular groove 62 is formed in the outer surface of the closed end wall so as to be concentric with the through hole 61. Additionally, a plurality of guide grooves 63 are formed extending radially outwardly between the through hole 61 and the annular groove 62. In the peripheral wall of the inner part 22B, D-cut passages 64 (only one of them is illustrated in FIG. 4) are formed extending in parallel with the longitudinal axis of the inner part 22B so as to be continuous with the guide groove 63. The inner part 22B is further formed, on the open end, with a cutout 65 continuous with the corresponding D-cut passage 64.

<Configurations of Outer Member, Base, and Cap>

The base 25 and the cap 26A are fixed to the upper and lower ends of the outer member 21 respectively by swaging as shown in FIG. 1, completing the outer shape of the actuator 3A. The outer member 21, base 25, and cap 26A, all of which are made of metal, surround the resin inner parts 22A, 22B, 22C to effectively enhancing the strength of the inner parts 22A, 22B, 22C.

Figure 5:
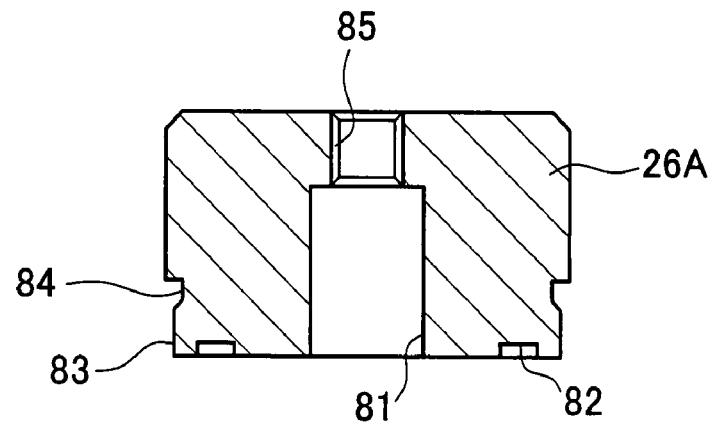
FIG. 5 is an exploded sectional view of a cap, a base, and an outer member shown in FIG. 1.
Figure 5:
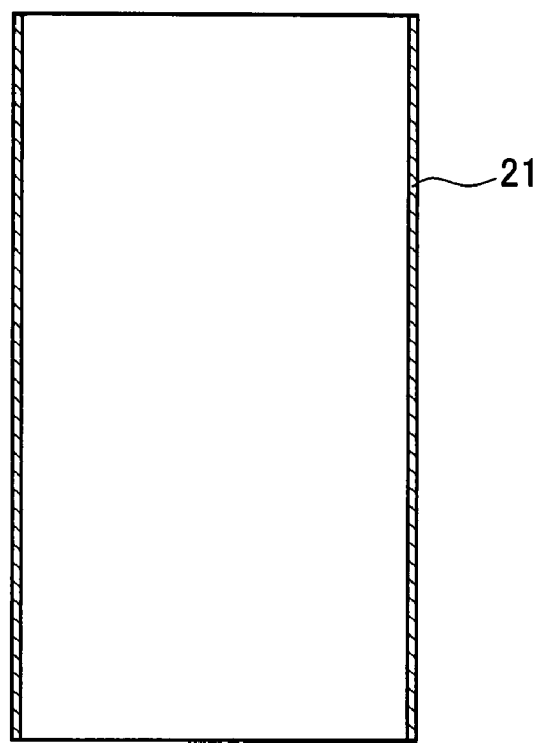
Figure 5:
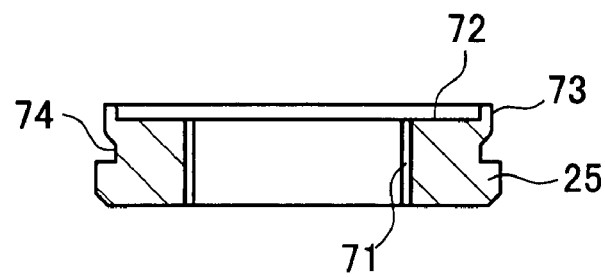

FIG. 5 is a sectional view of the cap 26A, the base 25, and the outer base 21, shown in FIG. 1, in an exploded form to show a relationship therebetween.

The outer member 21 has a cylindrical shape having open ends. This outer member 21 is produced by making a thin pipe made of metal having rigidity such as stainless steel by a drawing process or an extruding process and then cutting the pipe into a part of a predetermined length. The entire length of the outer member 21 is determined based on how many piston chambers are to be provided by the inner parts 22 (22A, 22B, 22C) to be loaded in stacked relation. The wall thickness of the outer member 21 is determined in consideration of pressure resistance to operation air, which is 0.5 mm in the present embodiment.

<Base and Cap>

The base 25 and the cap 26A are attached to both ends of the outer member 21 while holding the inner parts 22A, 22B, 22C in stacked relation in the outer member 21 against the resilient force of the compression spring 29A, thus forming a space (clearance) inside the outer member 21. The base 25 and the cap 26A are made of a rigid metal material such as stainless steel and aluminum into a cylindrical shape. The base 25 and the cap 26A are in contact with the closed ends of the inner parts 22A, 22C respectively to support the inner parts 22A, 22C.

The base 25 is designed to have a cylindrical shape with an outermost diameter equal to or larger than the outer diameter of the outer member 21. The base 25 is centrally formed with a connection hole 71 having an internally threaded surface (a female screw) engaging an externally threaded surface (a male screw) of the adaptor 11. The base 25 is formed, on one end face (the upper surface in FIG. 5), with a positioning recess 72 concentric with the connection hole 71 for positioning the inner part 22A. A press-fit portion 73 having a press-fit allowance is circumferentially provided on the end face with the positioning recess 72 in such a manner as to be press-fitted in an open end of the outer member 21. The base 25 is further formed with an annular groove 74 on the outer periphery, radially inwardly from the press-fit portion 73. In this annular groove 74, the end portion of the outer member 21 is inwardly deformed or bent to be swaged.

The cap 26A is designed to have a cylindrical shape with an outermost diameter equal to or larger than the outer diameter of the outer member 21. The cap 26A is formed with a cylindrical insertion hole 81 opening on the center of one end face (the lower surface in FIG. 5) of the cap 26A. The insertion hole 81 receives the piston rod 52 of the piston 24 in a noncontact manner. In the lower surface of the cap 26A, an annular mounting groove 82 is circumferentially formed around the insertion hole 81 for receiving a seal member 37 (see FIG. 1) such as an O-ring made of an elastic material such as rubber and resin. The mounting groove 82 is formed to face the annular groove 62 of the inner part 22C. A press-fit portion 83 having a press-fit allowance is circumferentially provided on the lower surface of the cap 26A in such a manner as to be press-fitted in the other open end of the outer member 21. The cap 26A is further formed with an annular groove 84 on the outer periphery, radially inwardly from the press-fit portion 83. In this annular groove 84, the end portion of the outer member 21 is inwardly deformed or bent to be swaged. Such cap 26A is provided with the air supply and exhaust port 85 opening on the other end face (the upper surface in FIG. 5) and continuous with the insertion hole 81.

<Assembling Manner of Air-Operated Valve>

A manner of assembling the air-operated valve 1A having the above parts or components is explained as an example.

Firstly, the valve seat 8 is fixed to the mounting hole 7 of the body 4 and then the diaphragm 9 is set in the mounting hole 7. The holder 10 is inserted in the mounting hole 7 of the body 4 in such a manner as to hold down the outer edge of the diaphragm 9. The stem 13 is fitted in the holder 10 and then the adaptor 11 is threadedly engaged in the body 4 to be fixed therein. Thus, the valve section 2 is completed.

The actuator 3A is assembled in the following manner. The seal members 32, 33, 34, 35, 36 are placed respectively in the mounting grooves 45, 44, 46 of the piston 23 and the mounting grooves 53, 54 of the piston 24. The press-fit portion 73 of the base 25 is press-fitted in the open end (the lower end) of the outer member 21. Then, the inner part 22A, piston 23, inner part 22B, piston 24, compression spring 29A, and inner part 22C are loaded in order in the outer member 21. At this time, the piston rod 42 of the piston 23 is inserted in the through hole 61 of the inner part 22A to project downward from the base 25. The cap 26A is fitted in the open end (the upper end) of the outer member 21 by inserting the piston rod 52 protruding upward from the through hole 61 of the inner part 22C into the insertion hole 81 and press-fitting the press-fit portion 83 into the open end of the outer member 21 while pressing the seal member 37 between the annular groove 62 of the inner part 22C and the mounting groove 82 of the cap 26A. At this stage, the inner parts 22A, 22B, 22C, the pistons 23, 24, and the compression spring 29A are temporarily held in the outer member 21. Then, both ends of the outer member 21 are fixedly swaged on the base 25 and the cap 26A along the respective grooves 74, 84.

The actuator section 3A is then coupled to the valve section 2. Specifically, the adaptor 11 threadedly fixed to the body 4 is threaded in the connection hole 71 of the base 25. At this time, the piston rod 42 of the piston 23 protruding outward from the base 25 abuts on the stem 13, transmitting the resilient force of the compression spring 29A acting on the pistons 23, 24 to the diaphragm 9 through the stem 13 to place the diaphragm 9 in contact with the valve seat 8. Thus, the air-operated valve is completely assembled.

<Passage Configuration for Operation Air>

Figure 6:
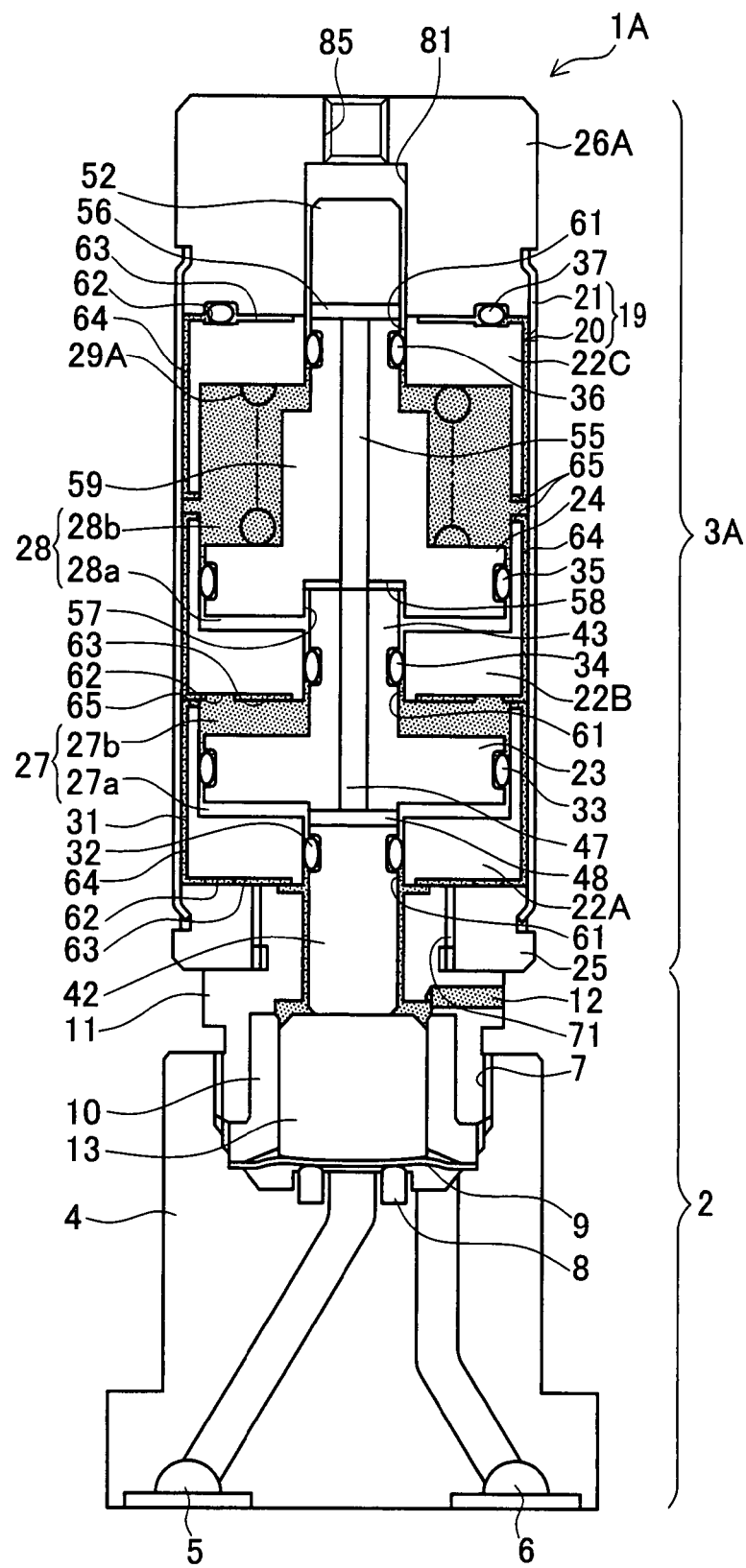
FIG. 6 is an explanatory view showing a passage configuration for operation air in the air-operated valve of FIG. 1.

The passage configuration for operation air in the air-operated valve assembled as above is explained below. FIG. 6 is an explanatory view showing a passage configuration for operation air in the air-operated valve 1A shown in FIG. 1.

The air supply and exhaust port 85 communicates with the pressure chamber 27a of the first piston chamber 27 via the insertion hole 81 of the cap 26A, the branch passage 56 and main passage 55 of the piston 24, and the main passage 47 and branch passage 48 of the piston 23. Further, the air supply and exhaust port 85 communicates with the pressure chamber 28a of the second piston chamber 28 via the insertion hole 81 of the cap 26A, the branch passage 56, main passage 55, communication passage 58, and fitting recess 57 of the piston 24.

As above, the air-operated valve 1A includes passages for supplying/discharging the operation air to/from the pressure chambers 27a, 28a through the passages 47, 48 of the piston 23 and the passages 55, 56 of the piston 24.

The air-operated valve 1A further includes the conducting passages 31 as illustrated by dotted areas in FIG. 6 to provide communication between the backpressure chambers 27b, 28b of the first and second piston chambers 27, 28 and the single breathing hole 12 of the adaptor 11.

The inner parts 22A, 22B, 22C form spaces between the respective D-cut passages 64 formed on the outer peripheries and the outer member 21. The backpressure chamber 27b of the first piston chamber 27 is communicated with the space defined by the D-cut passage 64 of the inner part 22A via the cutouts 65 of the inner part 22A and the guide grooves 63 of the inner part 22B. The backpressure chamber 28b of the second piston chamber 28 is communicated with the space defined by the D-cut passages 64 of the inner parts 22B, 22C via the cutouts 65 of the inner parts 22B, 22C.

Between the closed end of the inner part 22A and the base 25, a clearance is produced by the annular groove 62 and the guide grooves 63 of the inner part 22A. This clearance is communicated with the space formed between the inner parts 22A, 22B, 22C and the outer member 21 and simultaneously communicated with the center hole of the adaptor 11 provided with the breathing hole 12 communicating with the center hole.

In the air-operated valve 1A, as above, the space between the inner parts 22A, 22B, 22C, the space between the inner parts 22A, 22B, 22C and the outer member 21, and the space between the inner part 22A and the base 25 define the conducting passages 31 for provide communication between the backpressure chambers 27b, 28b of the first and second piston chambers 27, 28 and the breathing hole 12 of the adaptor 11.

<Explanation of Working of Air-Operated Valve>

The operation of the air-operated valve 1A of the first embodiment is described below.

The air-operated valve 1A is mounted on a mounting plate, a semiconductor manufacturing device, or others with bolts (not shown) inserted and tightened in mounting holes 14 of the body 4 as shown in FIG. 2. The air-operated valve 1A is connected to an air supply and exhaust control device (not shown) by use of a pipe (not shown) connected with the air supply and exhaust port 85 for controlling supplying/discharging of the operation air with respect to the air-operated valve 1A.

In the air-operated valve 1A, the pistons 23, 24 are held down by the resilient force of the compression spring 29A while no operation air is supplied to the air supply and exhaust port 85, placing the diaphragm 9 in contact with the valve seat 8 through the stem 13. Accordingly, the control fluid supplied to the primary-side port 5 is blocked from flowing in the secondary-side port 6 via the valve seat 8.

When the operation air is supplied to the air-operated valve 1A through the air supply and exhaust port 85, the operation air is allowed to flow in the pressure chamber 27a of the first piston chamber 27 via the branch passage 56 and the main passage 55 of the piston 24 and the main passage 47 and the branch passage 48 of the piston 23. The operation air is simultaneously allowed to flow in the pressure chamber 28a via the branch passage 56 and the main passage 55 of the piston 24, the communication passage 58, and the fitting recess 57. When the inner pressures of the pressure chambers 27a, 28a are increased to exceed the resilient force of the compression spring 29A, the pistons 23, 24 are smoothly moved upward in the figure (in an opposite direction to the valve seat 8) while pressing the air out of the backpressure chambers 27b, 28b into the conducting passages 31 to be exhausted through the breathing hole 12. Thus, the piston rod 42 is moved away from the stem 13, eliminating the pressure exerted on the diaphragm 9 in the direction of the valve seat. Thus, the diaphragm 9 is allowed to move away from the valve seat 8 by its own reaction force. In this state, the control fluid when supplied to the primary-side port 5 is permitted to flow from the primary-side port 5 to the secondary-side port 6 via the valve seat 8.

Then, when the operation air is exhausted from the pressure chambers 27a, 28a through the air supply and exhaust port 85 and the inner pressures of the pressure chambers 27a, 28a become lower than the resilient force of the compression spring 29A, the pistons 23, 24 are moved downward to bring the piston rod 42 into contact with the stem 13, exerting the pressure on the diaphragm 9 toward the valve seat through the stem 13. At this time, air taken in through the breathing hole 12 is supplied to the backpressure chambers 27b, 28b through the conducting passages 31 for assisting smooth downward movement of the pistons 23, 24. With the pistons 23, 24, the diaphragm 9 is held in contact with the valve seat 8 to interrupt the flow passage, blocking the control fluid from flowing to the secondary-side port 6 via the valve seat 8.

<Operations and Effects>

In the air-operated valve 1A of the first embodiment, the function of the cylinder 19 includes the function of causing the pistons 23, 24 to slide and the structural function of ensuring pressure resistance to operation air or the like. Specifically, the inner parts 22A, 22B, 22C serve as a component for carrying out the former function and the outer member 21 serves as a component for carrying out the latter function (see FIG. 1). Accordingly, the inner parts 22A, 22B, 22C tend to be more complex in configuration than the outer member 21 in order to constitute the first and second piston chambers 27, 28. According to the air-operated valve 1A of the first embodiment, the outer member 21 and the inner member 20 (the inner parts 22A, 22B, 22C) are made of different materials according to respective intended use; for example, the outer member 21 is made of high-priced materials while the inner member 20 is made of low-priced materials, which makes it possible to appropriately utilize materials and reduce costs thereof.

Further, in the air-operated valve 1A of the first embodiment, the cylinder 19 is configured such that the base 25 and the cap 26A are attached to close the open ends of the cylindrical outer member 21 in which the inner parts 22A, 22B, 22C are loaded (see FIG. 1). This configuration can eliminate the need for machining to form the outer member 21, base 25, and cap 26A into cup shape. Thus, the outer member 21, base 25, and cap 26A have no wasted portions that have to be cut away. The air-operated valve 1A of the first embodiment can therefore achieve a reduction in machining cost and material cost.

Figure 31:
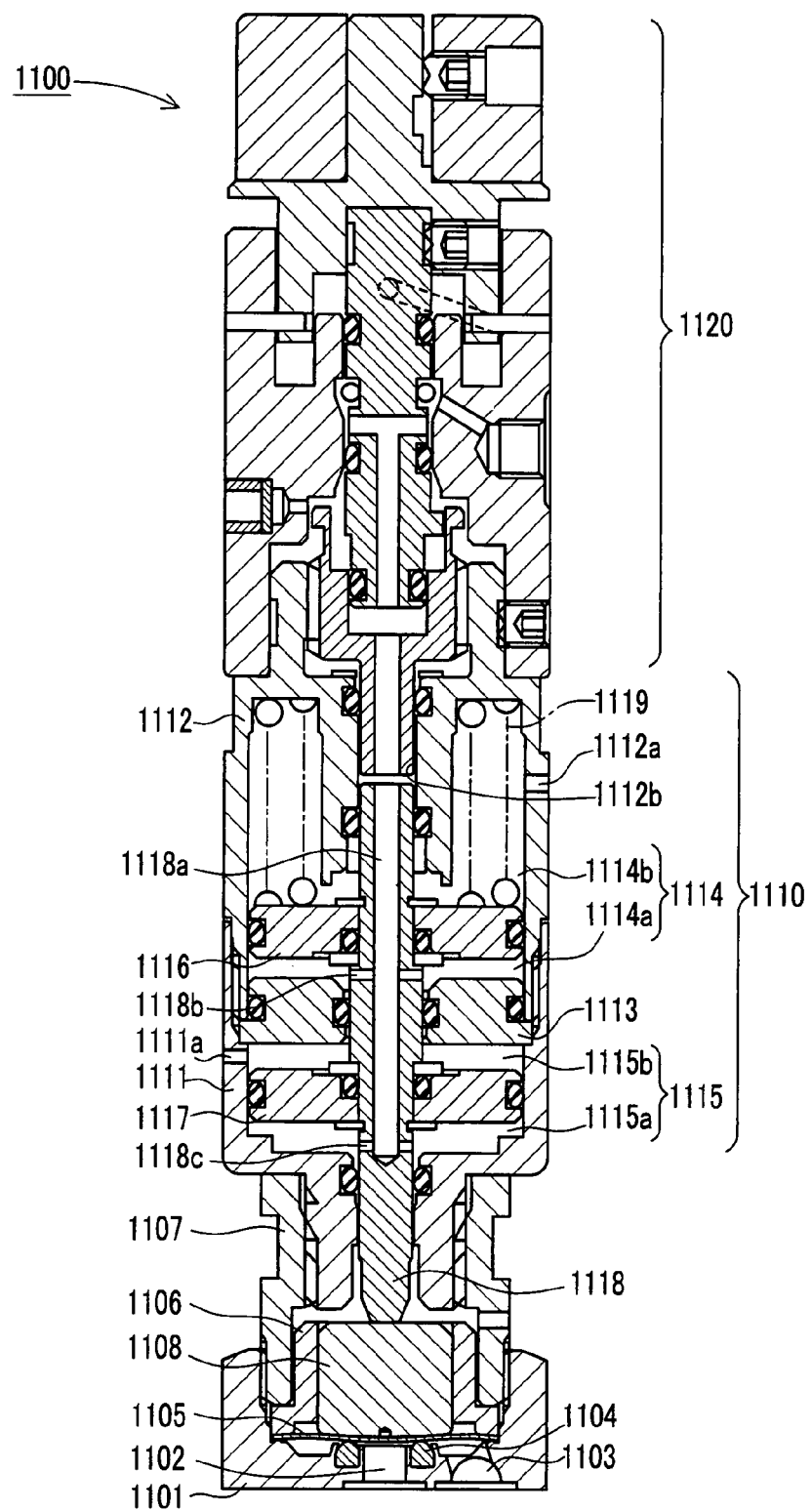
FIG. 31 is a sectional view of a conventional air-operated valve.

In the air-operated valve 1A of the first embodiment with no additional partition plate as provided in the conventional case (see FIG. 31), the inner parts 22A, 22B, 22C are stacked one on another so that the open end of one of the inner parts faces the open end or closed end of another inner part, thereby forming the first and second piston chambers 27, 28 partitioned by the closed ends of the inner parts 22A, 22B, 22C placed in stacked relation (see FIG. 1). The pistons 23, 24 are placed extending through the corresponding through holes 61 formed in the closed end walls of the inner parts 22A, 22B, 22C so that the pistons 23, 24 are slidable in the first and second piston chambers 27, 28 respectively. Such combination of the plural inner parts 22A, 22B, 22C constituting the inner member 20 can provide the first and second piston chambers 27, 28. According to the air-operated valve 1A of the first embodiment, therefore, the inner parts 22A, 22B, 22C may be common components used for forming the first and second piston chambers 27, 28. This makes it possible to achieve a reduction in cost.

In the air-operated valve 1A of the first embodiment, the inner parts 22A, 22B, 22C are resin molded components made by injection molding, which needs less machining time and less cutting works. Further, the surface roughness of the inner surfaces along which the pitons 23, 24 slide can be enhanced readily without applying cutting works, with the result that the machining cost can further be reduced. On the other hand, the outer member 21 is a metal pipe simply formed by a drawing process or an extruding process. Thus, the inner parts 22A, 22B, 22C and the outer member 21 can be manufactured at low costs. The air-operated valve 1A is also arranged such that the inner parts 22A, 22B, 22C are loaded in the outer member 21 for enhancing the strength of the inner parts 22A, 22B, 22C. Thus, the inner parts 22A, 22B, 22C may be designed to have thin peripheral walls for downsizing. According to the air-operated valve 1A of the first embodiment, the outer member 21 and the inner parts 22A, 22B, 22C may have thin peripheral walls, which makes it possible to downsizing of the cylinder 19, saving on machining costs of the inner parts 22A, 22B, 22C and the outer member 21, leading to a reduction in total cost.

In the air-operated valve 1A of the first embodiment, furthermore, the inner parts 22A, 22B, 22C are made of resin while the outer member 21 supporting the inner parts 22A, 22B, 22C, the base 25, and the cap 26A are made of metal having rigidity. Such configuration can achieve weight reduction as compared with the conventional air-operated valve 1100 (see FIG. 31) with the cylinder entirely made of metal. To be more specific, the air-operated valve 1A of the first embodiment (see FIG. 1) can attain a 10% reduction in total weight as compared with the air-operated valve 1100 (see FIG. 31) except for the hand-operated mechanism 1120.

In the air-operated valve 1A of the first embodiment, the inner parts 22A, 22B, 22C are inserted in the pipe-shaped outer member 21 whose both ends portions are swaged on the cylindrical base 25 and cap 26A, thereby supporting the peripheries of the inner parts 22A, 22B, 22C. The cylinder 19 can thus be assembled readily. The air-operated valve 1A of the first embodiment does not need for cutting works on the base 25 and the cap 26A to provide hollow portions as in the conventional air-operated valve 1100 (see FIG. 31), so that a further cost reduction can be achieved. The outer member 21 may be deigned to thin if only it is enough to ensure pressure resistance to the operation air. The air-operated valve 1A of the first embodiment can therefore comprise the pistons 23, 24 larger in diameter than the conventional case without changing the outer diameter of the actuator section 1110 of the conventional air-operated valve 1100 (see FIG. 31), so that the spring load of the compression spring 29A can be increased to enhance a sealing property. Consequently, this air-operated valve 1A can control higher-pressure control fluid.

The air-operated valve 1A of the first embodiment comprises the conducting passages 31 between the inner parts 22A, 22B, 22C and the outer member 21 (see FIG. 6) to provide communication between the backpressure chambers 27b, 28b of the first and second piston chambers 27, 28 and the single breathing hole 12. It is therefore possible to minimize the number of machining works to form the breathing hole 12.

In the air-operated valve 1A of the first embodiment, further, the pistons 23, 24 are resin molded components made of resin by injection molding. This makes it possible to reduce the number of cutting works for producing the pistons for a reduction in cost, and reduce the total weight of the air-operated valve 1A.

In the air-operated valve 1A of the first embodiment, the branch passage 48 for supplying the operation air from the main passage 47 to the pressure chamber 27a of the first piston chamber 27 is rectangular in section (see FIG. 3). In a downsized valve, the pressure chamber 27a has to be small in dimension (height) in the axial direction. If the branch passage 48 was circular in section; the diameter of the passage section is restricted by the height of the pressure chamber 27a and thus the passage could not have a large sectional area. In the air-operated valve 1A of the first embodiment, however, the branch passage 48 can be designed to have a section wider in horizontal width to provide a large sectional area without restriction by the height of the pressure chamber 27a. In the case where the vertical height of the branch passage 48 in the axial direction must be 1 mm, the branch passage 48 is preferably designed to have a rectangular section, 1 mm in vertical height and 2.5 mm in horizontal width, which can provide a sectional area about three times larger than the circular sectional area with a diameter of 1 mm. According to the air-operated valve 1A of the first embodiment, it is possible to efficiently supply and exhaust the operation air with respect to the pressure chamber 27a through the branch passage 48 to maintain good responsibility. In the air-operated valve 1A of the first embodiment, there is no need to a totally longer piston 23 and a pressure chamber 27a enlarged in volume.

Second Embodiment

Figure 7:
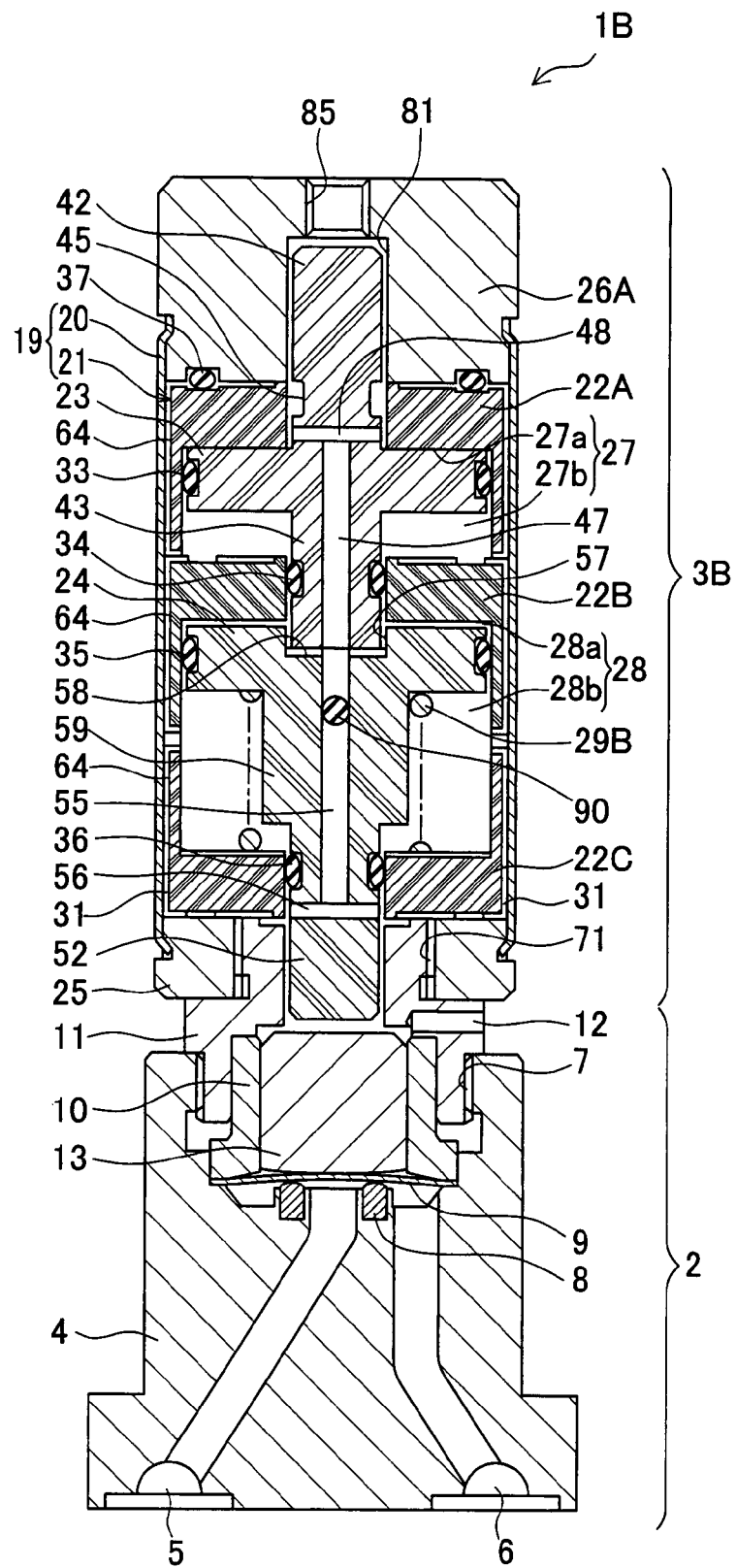
FIG. 7 is a sectional view of an air-operated valve of a second embodiment according to the present invention.

A second embodiment of an air-operated valve according to the present invention will be described below. FIG. 7 is a sectional view of an air-operated valve 1B of the second embodiment.

The air-operated valve 1B of the second embodiment is different in some parts or components from those of the air-operated valve 1A of the first embodiment. Specifically, the outer member 21 and the inner parts 22A, 22B, 22C of the actuator 3A of a normally closed type are placed in an upside-down orientation together with the pistons 23, 24 to constitute an actuator section 3B of a normally open type. The air-operated valve 1B of the second embodiment therefore includes many identical parts or components to the air-operated valve 1A of the first embodiment. The following description is therefore focused on the differences from the first embodiment without repeating the same explanation. The identical parts and components are given the same reference codes in the figures.

<Overall Construction>

The air-operated valve 1B includes an actuator section 3B in which the inner part 22C, the piston 24, the inner part 22B, the piston 23, and the inner part 22A are stacked in this order from below in the outer member 21, and upper and lower end of the outer member 21 are swaged on the cap 26A and the base 25 respectively. In the air-operated valve 1B, a compression spring 29B which is an example of an "urging member" is set in compressed form in the backpressure chamber 28b of the second piston chamber 28. This compression spring 29B has only to have the force for separating the piston 24 from the stem 13 and thus may be selected to have a resilient force smaller than that of the compression spring 29A of the first embodiment. In the above air-operated valve 1B, the pistons 23, 24 are urged upward by the resilient force of the compression spring 29B to hold the piston rod 52 apart from the stem 13. Thus, the diaphragm 9 is not pressed toward the valve seat.

The piston 23 is loaded in the cylinder 19 with the piston rod 52 having the mounting groove 54 attached with the seal member 36 and the piston rod 42 having the mounting groove 45 unattached with the seal member 32. When the piston rod 42 without the seal member 32 is inserted in the insertion hole 81 of the cap 26A, the piston 23 provides a clearance between the outer surface of the piston rod 42 and the inner surface of the insertion hole 81, whereby providing communication between the air supply and exhaust port 85 and the pressure chamber 27a of the first piston chamber 27.

On the other hand, the piston 24 is placed with the piston rod 52 inserted through the connection hole 71 of the base 25 so that the piston 24 is movable toward and away from the valve section 2. The piston 24 is arranged such that a stopper 90 which is an example of a "blocking member" such as a steel ball and a spherical elastic member is press-fitted in the main passage 55 to hermetically block the main passage 55. Accordingly, the air supply and exhaust port 85 of the cap 26A is therefore allowed to communicate with the pressure chamber 28a of the second piston chamber 28 via the insertion hole 81, the branch passage 48 and the main passage 47 of the piston 23, the communication passage 58 of the piston 24, and the fitting recess 57.

In the air-operated valve 1B, similarly, a plurality of conducting passages 31 are formed between the inner parts 22A, 22B, 22C and the outer member 21 by the D-cut passages 64 formed on the peripheries of the inner parts 22A, 22B, 22C to provide communication between the backpressure chambers 27b, 28b of the first and second piston chambers 27, 28 and the breathing hole 12.

<Explanation of Working of Air-Operated Valve>

The above air-operated valve 1B is arranged such that while no operation air is supplied to the air supply and exhaust port 85, the piston 24 and the piston 23 are urged upward by the resilient force of the compression spring 29B. Thus, the diaphragm 9 is not pressed toward the valve seat and therefore is placed apart from the valve seat 8 by its own reaction force. In this state, when a control fluid is supplied to the primary-side port 5, the control fluid is permitted to flow from the primary-side port 5 to the secondary-side port 6 via the valve seat 8.

When the operation air is supplied to the air supply and exhaust port 85, on the other hand, the operation air is allowed to flow in the pressure chamber 27a of the first piston 27 through the insertion hole 81 and simultaneously into the pressure chamber 28a of the second piston 28 through the insertion hole 81, the branch passage 48 and main passage 47 of the piston 23 and the communication passage 58 and fitting recess 57 of the piston 24, thereby pressurizing the pressure chambers 27a, 28a. When the inner pressures of the pressure chambers 27a, 28a exceed the resilient force of the compression spring 29B, the pistons 23, 24 are moved downward while causing the air to be exhausted from the backpressure chambers 28b, 27b through the breathing hole 12 via the conducting passages 31. Then, the piston rod 52 of the piston 24 abuts on the stem 13 to exert pressure on the diaphragm 9 toward the valve seat 8. When the pistons 23, 24 holds the diaphragm 9 in contact with the valve seat 8, the control fluid is blocked from flowing from the primary-side port 5 to the secondary-side port 6 via the valve set 8.

When the operation air is exhausted from the pressure chambers 27a, 28a through the air supply and exhaust port 85 and the inner pressures of the pressure chambers 27a, 28a are reduced below the resilient force of the compression spring 29B, the pistons 23, 24 are moved upward away from the stem 13. At this time, the air is supplied to the backpressure chambers 27b, 28b through the breathing hole 12 via the conducting passages 31 for assisting smooth upward movement of the pistons 23, 24. The diaphragm 9, which does not become pressed toward the valve seat, moves away from the valve seat by its own reaction force. This permits the control fluid supplied to the primary-side port 5 to flow to the secondary-side port 6 via the valve seat 8.

<Operations and Effects>

According to the air-operated valve 1B of the second embodiment, the inner parts 22A, 22B, 22C are loaded in the hollow portion of the outer member 21 to form the first and second piston chambers 27, 28, thereby constituting the cylinder 19 in a double walled construction (see FIG. 7). This makes it possible to achieve a reduction in cost as in the case of the air-operated valve 1A of the first embodiment.

The air-operated valve 1B of the second embodiment adapted to exert a driving force to the valve section 2 by moving the pistons 23, 24 in the cylinder 19 by the operation air. The valve 1B is constructed in a normally closed configuration by changing the orientations of the parts and components from those in the valve 1A of the first embodiment in the normally open valve. Specifically, when the inner member 20 (the inner parts 22A, 22B, 22C) and the pistons 23, 24 are to be loaded in the hollow portion of the outer member 21 so that the piston rods 42 52 protrude in opposite directions to each other with respect to the piston portions 41, 51, they are inserted in an axially reversed direction from that in the first embodiment for the normally open valve.

In other words, the pistons 23, 24 are arranged between the inner parts 22A, 22B, 22C and housed in the cylinder 19 in order to exert the driving force to the valve section 2 via the piston rod 42 in the air-operated valve 1A in the normally closed configuration as shown in FIG. 1 and to exert the driving force to the valve section 2 via the piston rod 52 in the air-operated valve 1B in the normally open configuration as shown in FIG. 7. The air-operated valve 1B uses the pistons 23, 24 and the inner member 20 (the inner parts 22A, 22B, 22C) common to the air-operated valve 1A. This makes it possible to easily change the configuration of the valve between the normally closed type (1A) and the normally open type (1B). Accordingly, there is no need to stock any special base, cap, piston for the normally open type such as the conventional air-operated valve 1100 (see FIG. 31) or those for the normally closed type. According to the air-operated valve 1B of the second embodiment, consequently, valve components such as the pistons 23, 24 can be used in common between the normally open configuration and the normally closed configuration, achieving a reduction in cost.

Further, in the air-operated valve 1B of the second embodiment, the compression spring 29B for the normally open configuration is used in place of the compression spring 29A for the normally closed configuration (see FIGS. 1 and 7), both being different in resilient property. Accordingly, the normally open configuration and the normally closed configuration can have almost equivalent valve-closing force so that a uniform load acts on the valve section 2 in either case.

In the air-operated valve 1B of the second embodiment, the piston 23 is formed with the axially extending main passage 47 and the branch passage 48 extending perpendicular to the main passage 47, and the piston 24 is formed with the axially extending main passage 55 and the branch passage 56 extending perpendicular to the main passage 55 in which the stopper 90 is fitted to block the flow to the branch passage 56. The air-operated valve 1B of the normally open type can thus include the different flow passage for supplying the operation air to the pressure chambers 27a, 28a from that in the air-operated valve 1A of the normally closed type (see FIGS. 1 and 7). According to the air-operated valve 1B of the second embodiment mentioned as above, the internal passage configuration can be changed by simply using the stopper 90 in the pistons 23, 24 placed in the reversed orientation from that in the air-operated valve 1A. Thus, the pistons 23, 24 may be common parts to reduce a machining cost and a maintenance cost for reduction in total costs of the air-operated valves while enabling supply of the operation air to the pressure chambers 27a, 28a in both the normally closed configuration and the normally open configuration.

In the air-operated valve 1B of the second embodiment of the normally open type, the seal member 36 is attached to only the piston rod 52 and the seal member 32 is unattached to the piston rod 42 as shown in FIG. 7, different from the air-operated valve 1A of the normally closed type in which the seal members 32, 36 are attached to the piston rods 42, 52 respectively as shown in FIG. 1. By simply attaching or detaching the seal member 32 with respect to the piston rod 42, the same pistons 23, 24 can be used in both the normally closed configuration and the normally open configuration by reversing their orientations. Consequently, the costs for machining and maintaining the pistons 23, 24 can be reduced.

Third Embodiment

Figure 8:
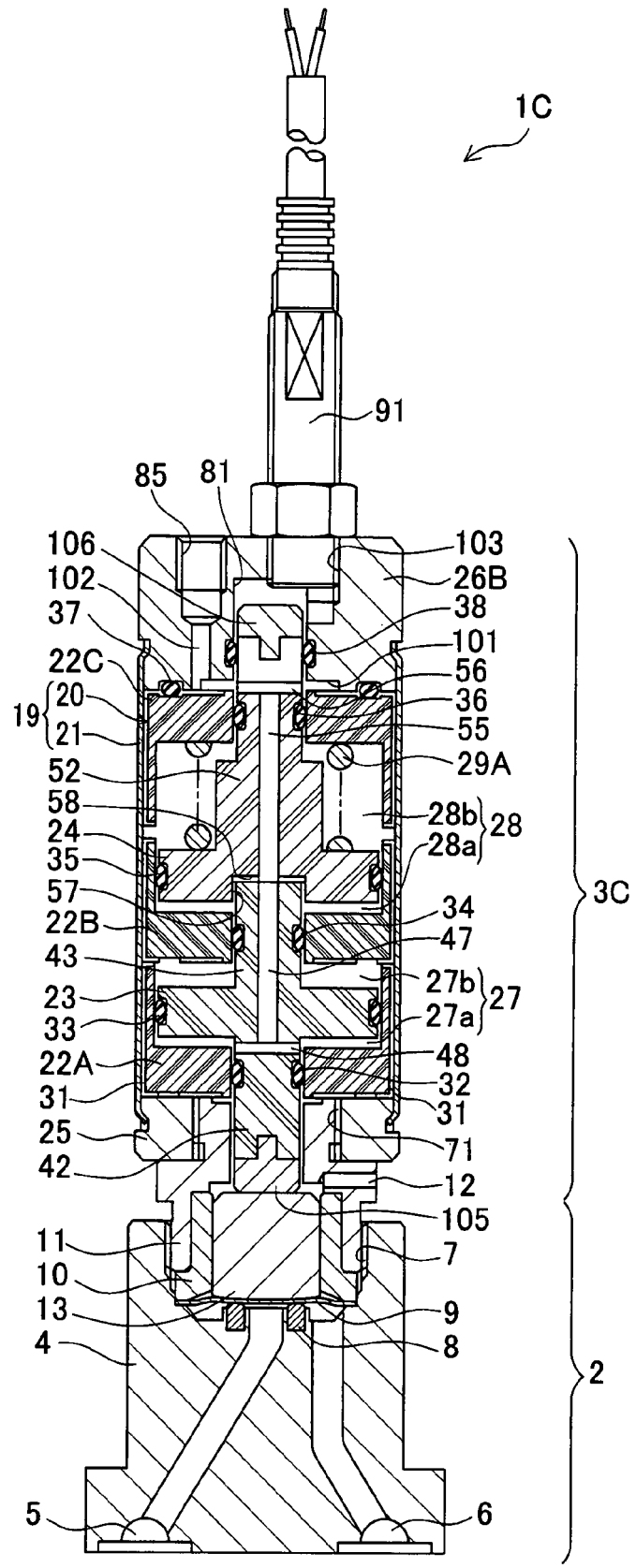
FIG. 8 is a sectional view of an air-operated valve of a third embodiment according to the present invention, in which a cap attached with a valve open/close detection sensor.
Figure 9:
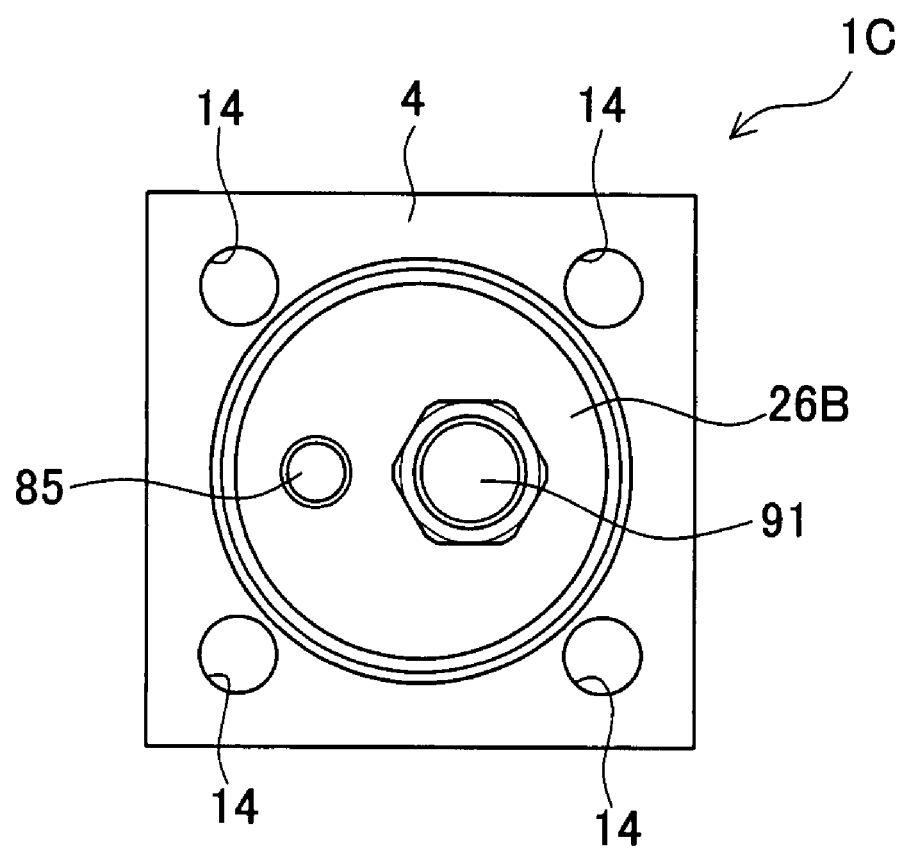
FIG. 9 is a plan view of the air-operated valve of FIG. 8.

A third embodiment of an air-operated valve according to the present invention will be described below referring to the drawings. FIG. 8 is a sectional view of an air-operated valve 1C of the third embodiment, including a cap 26B provided with a valve opening/closing detection sensor 91. FIG. 9 is a plan view of the air-operated valve 1C of FIG. 8.

The air-operated valve 1C of the third embodiment is different from the air-operated valve 1A of the first embodiment in that pistons 23, 24 are fixedly provided with metal parts 105, 106 which are an example of an "wear-resistive part" and that caps 26B, 26C are selectively used for changing or adding functions. The following description is therefore focused on the differences from the first embodiment without repeating the same explanation. The identical parts and components are given the same reference codes in the figures.

<Overall Construction>

As shown in FIG. 8, the air-operated valve 1C has an outer shape that the valve section 2 is coupled to the actuator section 3. Upper and lower open ends of the outer member 21 housing the inner parts 22A, 22B, 22C, the pistons 23, 24, and the compression spring 29A are swaged on the base 25 and the cap 26B.

The cap 26B is equal in outer diameter to the cap 26A. The upper open end of the outer member 21 is rotatably swaged on the cap 26B. The end face (the lower surface in FIG. 8) of the cap 26B is formed with a cylindrical recess 101 around an open end of an insertion hole 81. An air supply and exhaust port 85 is formed to open on the other end face (the upper surface in FIG. 8) of the cap 26B and be deviated radially outward from the insertion hole 81. The air supply and exhaust port 85 communicates with the cylindrical recess 101 through a bypass passage 102. Further, a connection hole 103 which is an example of a "mounting portion" is formed opening on the upper surface of the cap 26B and partly overlapping the insertion hole 81 in misaligned relation to each other. The connection hole 103 is formed with internal threads (a female screw) in which the valve opening/closing detection sensor 91 is threadedly engaged. This sensor 91 is screwed and fixed in the connection hole 103 with a sensor portion protruding in the insertion hole 81.

In the air-operated valve 1C, the piston rod 42 of the piston 23 and the piston rod 52 of the piston 24 are fixedly attached, at respective distal ends, with metal parts 105 and 106. These metal parts 105, 106 are made of magnetized metal having high rigidity and strength, such as stainless steel and brass. The metal parts 105, 106 are fixed to the resin piston rods 42, 52 by an appropriate technique such as press-fitting, insert molding, bonding, and welding.

<Mounting of Air-Operated Valve>

The air-operated valve 1C is mounted on a mounting plate, a semiconductor manufacturing device, or others with bolts (not shown) inserted in mounting holes 14. An air supply and exhaust pipe is connected from above to the air supply and exhaust port 85 of the air-operated valve 1C. If the air supply and exhaust port 85 is misaligned with the air supply and exhaust pipe, a connecting work may take much time. However, the cap 26B of the air-operated valve 1C is rotatably swaged on the outer member 21. Even if the air supply and exhaust port 85 is misaligned with the air supply and exhaust pipe, accordingly, the cap 26B is required only to be turned after the air-operated valve 1C is mounted on the mounting plate or the like, thereby adjusting the position of the air supply and exhaust port 85. The air-operated valve 1C is connected to an external control device not shown through an upwardly extending wire of the valve opening/closing detection sensor 91.

<Explanation of Working of Air-Operated Valve>

The air-operated valve 1C is arranged such that while no operation air is supplied to the air supply and exhaust port 85, the pistons 23, 24 are urged downward by the resilient force of the compression spring 29A. Thus, the diaphragm 9 is pressed down in contact with the valve seat 8 through the stem 13.

After that, the operation air is supplied to the air supply and exhaust port 85, the operation air is allowed to flow in the pressure chamber 27a via the bypass passage 102, the cylindrical recess 101, the branch passage 56 and the main passage 55 of the piston 24, the main passage 47 and the branch passage 48 of the piston 23 and also flow in the pressure chamber 28a via the main passage 55, the communication passage 58, and the fitting recess 57 of the piston 24. When the inner pressures of the pressure chambers 27a, 28a exceed the resilient force of the compression spring 29A, the pistons 23, 24 are moved upward, eliminating the pressure exerted on the diaphragm 9 through the stem 13 in the direction of the valve seat, so that the diaphragm 9 moves away from the valve seat 8 by its own reaction force. In this state, the control fluid when supplied to the primary-side port 5 is allowed to flow from the primary-side port 5 to the secondary-side port 6 via the valve seat 8.

Then, when the operation air is exhausted from the pressure chambers 27a, 28a through the air supply and exhaust port 85, the pistons 23, 24 are moved downward by the resilient force of the compression spring 29A to bring the piston rod 42 into contact with the stem 13, exerting the pressure on the diaphragm 9 toward the valve seat 8 through the stem 13. By this force, the diaphragm 9 is pressed on the valve seat 8, thus blocking the flow of the control fluid supplied to the primary-side port 5 from flowing in the secondary-side port 6 via the valve seat 8.

In the air-operated valve 1C that is operated to open and close as above, the open/closed state is detected by the valve opening/closing detection sensor 91. Specifically, when the pistons 23, 24 are moved upward to place the air-operated valve 1C in the open state, the metal part 106 of the piston rod 52 of the piston 24 comes close to the valve opening/closing detection sensor 91. When sensing the metal part 106, the sensor 91 determines that the air-operated valve 1C in the open state and sends a detection signal representing the valve open state to the external control device not shown. When the pistons 23, 24 are moved downward to place the air-operated valve 1C in the closed state, on the other hand, the metal part 106 moves away from the valve opening/closing detection sensor 91. When the sensor 91 does not detect the metal part 106, the sensor 91 determines that the air-operated valve 1C is in the closed state and accordingly sends a detection signal representing the valve closed state to the external control device not shown.

<Function Changes>

The valve opening/closing detection sensor 91 is detachably attached to the connection hole 103 of the cap 26B. Accordingly, replacement of devices to be attached to the connection hole 103 can easily change the function to be provided in the air-operated valve 1C.

Figure 10:
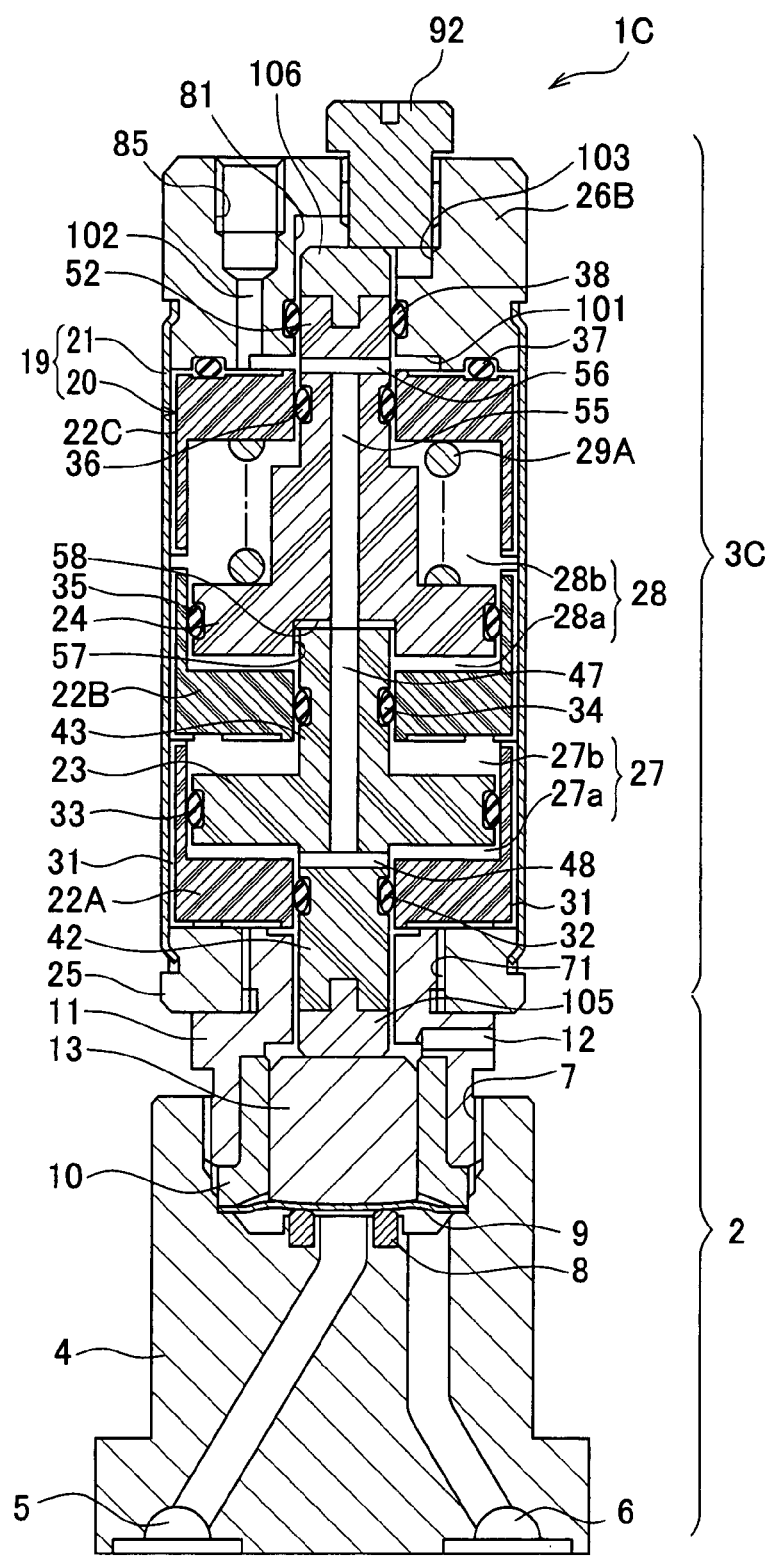
FIG. 10 is a sectional view of the air-operated valve of FIG. 8, including a cap attached with a stroke adjusting knob.
Figure 11:
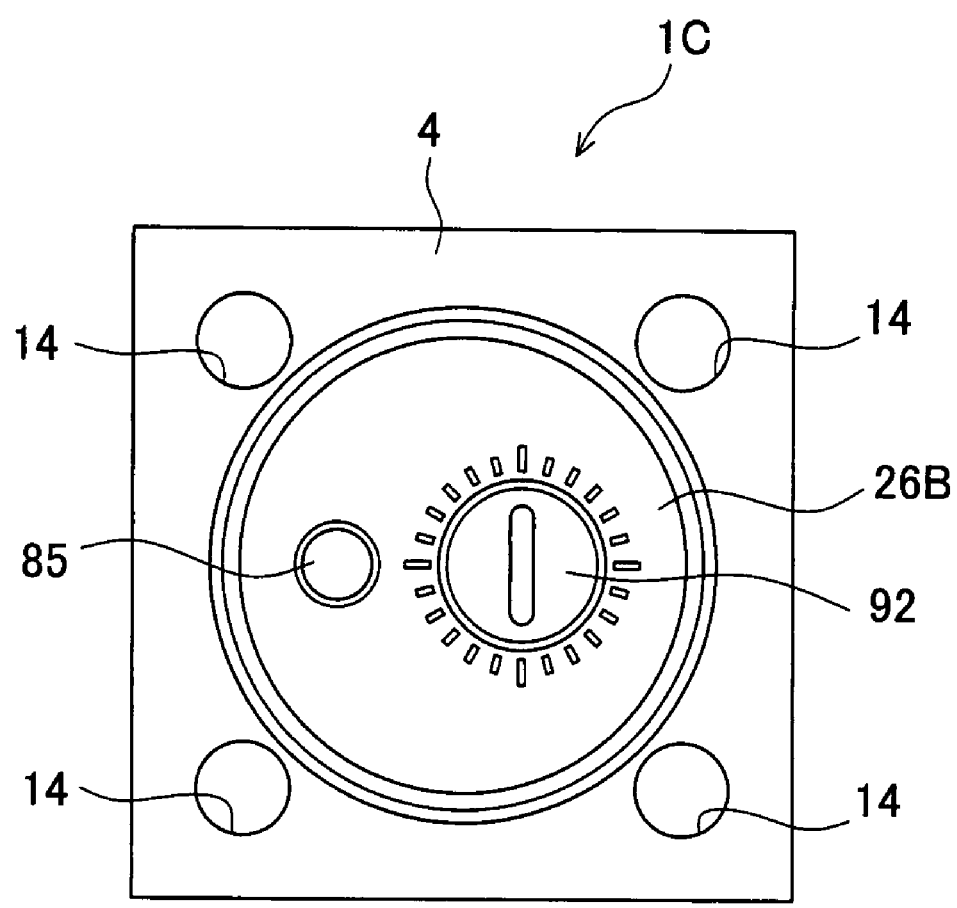
FIG. 11 is a plan view of the air-operated valve of FIG. 10.

FIG. 10 is a sectional view of the air-operated valve 1C of FIG. 8, including the cap 26B attached with a stroke adjusting knob 92. FIG. 11 is a plan view of the air-operated valve 1C of FIG. 10.

The air-operated valve 1C shown in FIGS. 10 and 11 is arranged such that the stroke adjusting knob 92 which is an example of a "valve opening adjustment mechanism" is threadedly engaged in the connection hole 103 of the cap 26B. By adjusting the rotation amount (angle) of the stroke adjusting knob 92, the position (distance) of the lower end portion of the knob 92 protruding into the insertion hole 81 is adjusted. In the air-operated valve 1C, the pistons 23, 24 are movable until the piston rod 52 comes into contact with the stroke adjusting knob 92, thereby controlling the amount (stroke) of the diaphragm 9 when moves away from the valve seat 8. At this time, the distal end of the piston rod 52 abuts on the stroke adjusting knob 92. However, such abutment against the knob 92 is unlikely to cause wear or deformation of the piston rod 52 because of the metal part 106 attached to its distal end. It should be noted that a scale may be provided around the stroke adjusting knob 92 of the cap 26B as shown in FIG. 11, which makes it possible to facilitate the control of flow rate.

Figure 12:
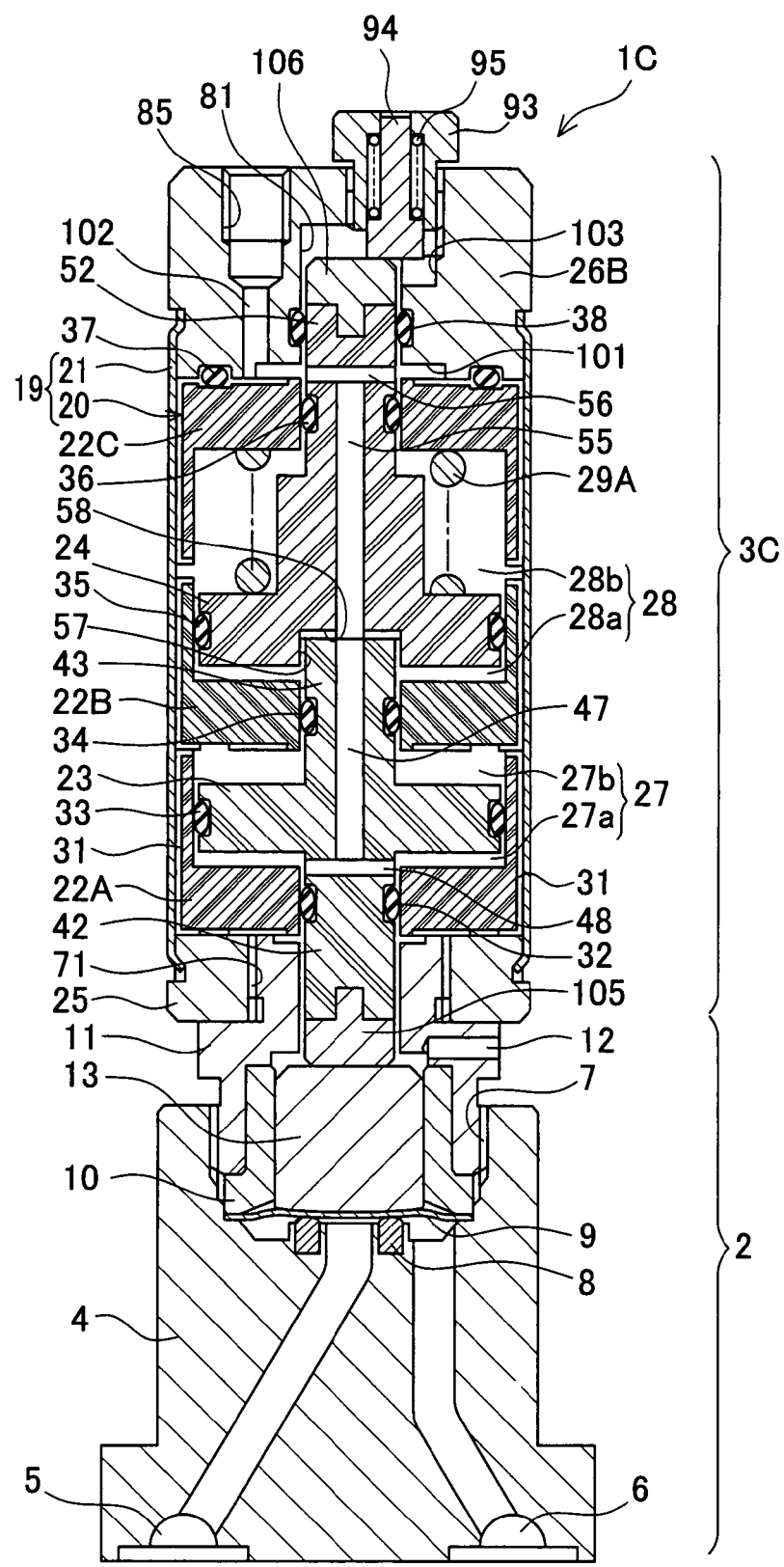
FIG. 12 is a sectional view of the air-operated valve of FIG. 8, including the cap attached with an opening/closing indicator, showing a valve closed state.
Figure 13:
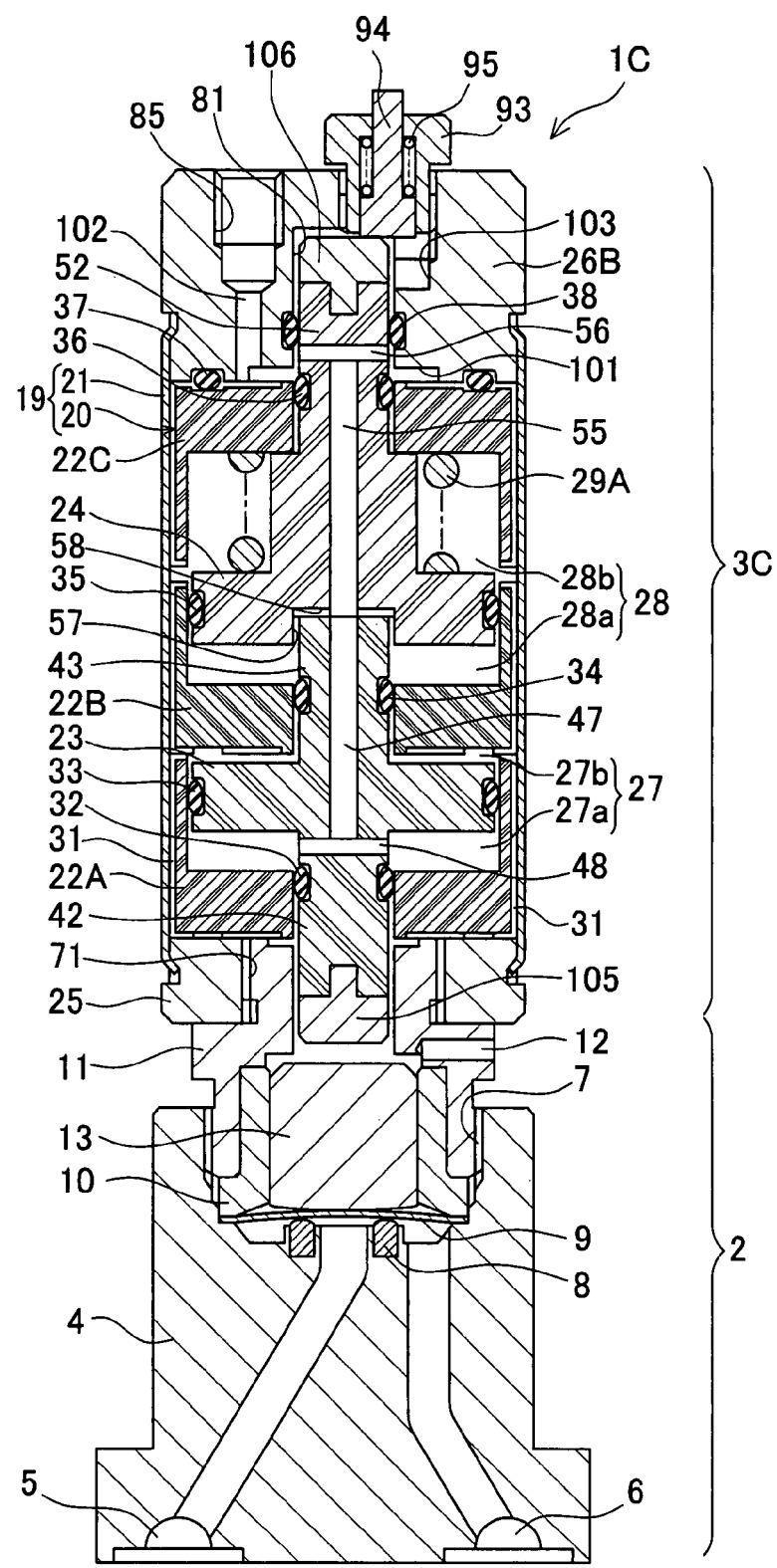
FIG. 13 is a view showing a valve open state of the air-operated valve of FIG. 12.

FIG. 12 is a sectional view of the air-operated valve 1C of FIG. 8 in the valve closed state, including the cap 26B attached with an opening/closing indicator. FIG. 13 is a view showing the valve open state of the air-operated valve of FIG. 12.

In the air-operated valve 1C shown in FIGS. 12 and 13, the opening/closing indicator 93 is treadedly engaged in the connection hole 103 of the cap 26B. The indicator 93 includes a rod 94 movable to protrude outside (upward), which is urged toward the piston rod 52 of the piston 24, or the metal part 106, by a coil spring 95. According to this air-operated valve 1C, upward movement of the pistons 23, 24 causes the rod 94 to protrude upward from the indicator 93 against the resilient force of the coil spring 95 as shown in FIG. 13. Downward movement of the pistons 23, 24 allows the rod 94 to move downward by the resilient force of the coil spring 95 as shown in FIG. 12. This protruding amount (length) of the rod 94 from the indicator 93 makes it possible for a user to recognize the valve open or closed state. In this case, the piston rod 52 is unlikely to be abraded by the rod 94 owing to the metal part 106 attached to the piston rod 52.

Figure 14:
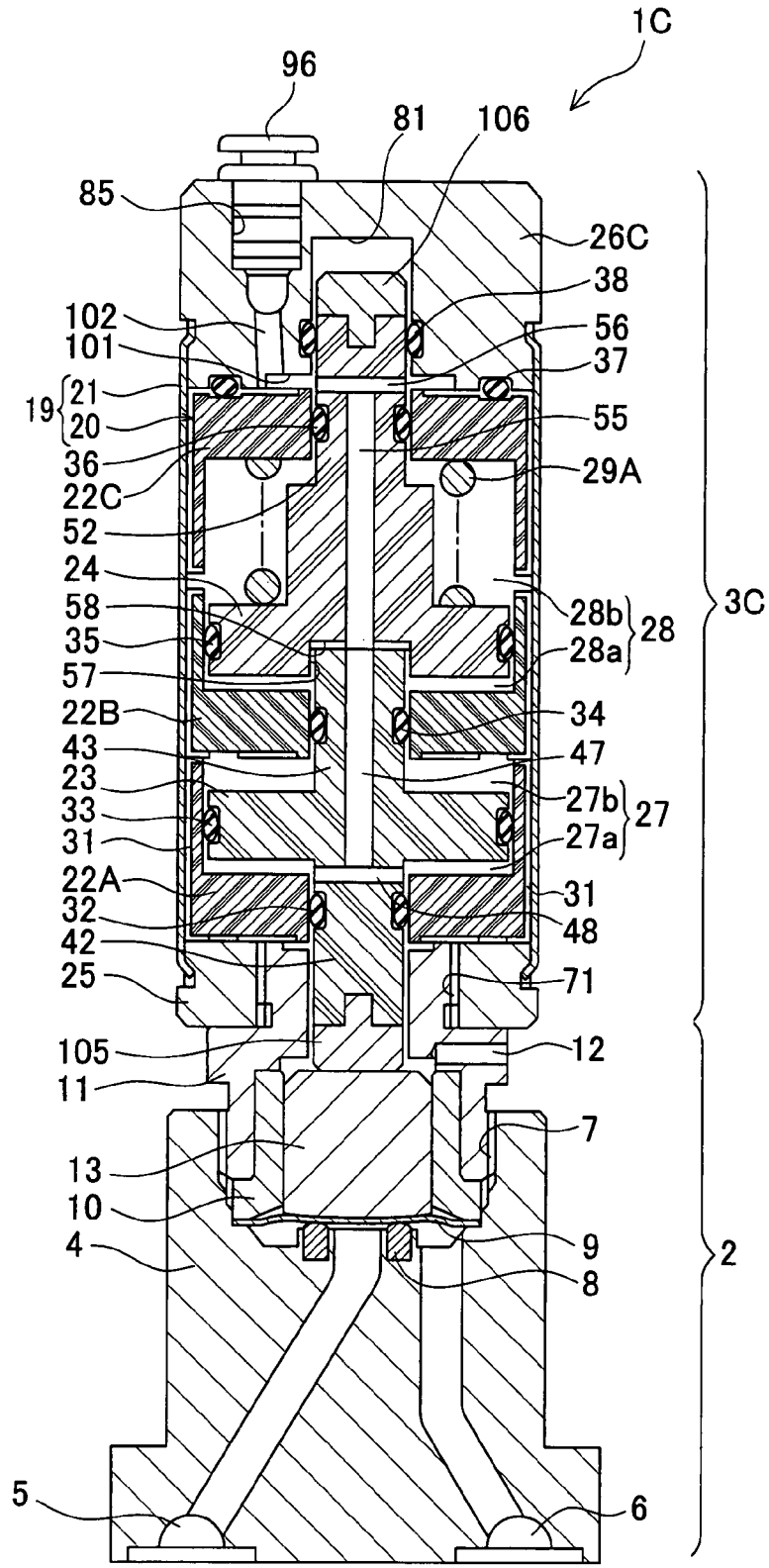
FIG. 14 is a sectional view of the air-operated valve of FIG. 8, including, another cap attached with an instant joint.

FIG. 14 is a sectional view of the air-operated valve 1C of FIG. 9, including another cap 26C attached with an instant joint 96, instead of the cap 26B.

In the air-operated valve 1C in FIG. 14, the outer member 21 is swaged on the cap 26C attached with the instant joint 96. The cap 26C is formed with an air supply and exhaust port 85 in a position deviated radially outward from the insertion hole 81 to receive the instant joint 96. The air supply and exhaust port 85 communicates with the cylindrical recess 101 through the bypass passage 102. This air-operated valve 1C enables one-touch connection of an air supply and exhaust pipe to the instant joint 96 for facilitating piping.

<Operations and Effects>

In the air-operated valve 1C of the third embodiment, as above, the metal part 105 is attached to the distal end of the piston rod 42 of the piston 23 (see FIG. 8), thereby increasing wear resistance and strength of the piston rod 42. This can prevent degradation of the piston 23 even where the piston rod 42 abuts on the stem 13 to transmit the driving force to the diaphragm 9. In the air-operated valve 1C, the piston rod 42 is not abraded or damaged, so that the stroke of the pistons 23, 24 for operating the valve section 2 is unlikely to vary, thus providing a stable flow rate property.

According to the air-operated valve 1C of the third embodiment, the outer member 21 is swaged on the base 25 and the cap 26B or 26C so that the base 25 and the cap 26B or 26C are rotatable. Therefore, any rotating mechanism does not need to be added to the base 25 and the cap 26B, 26C. This contributes to a reduction in total height of the air-operated valve 1C. Further, the outer member 21 does not need to be subjected to a cutting work to form screws. This contributes to a reduction in cost.

In the air-operated valve 1C of the third embodiment, the cap 26B or 26C attached with one of various fluid control parts such as the valve opening/closing detection sensor 91, the stroke adjusting knob 92, and the opening/closing indicator 93, has an outer shape identical to that of the cap 26A of the first embodiment including only the air supply and exhaust port 85 (see FIGS. 1, 8, 10, 12 to 14). Accordingly, simple replacement of the caps 26A, 26B, 26C to be attached to the outer member 21 makes it possible to arbitrarily configure the air-operated valve with an intended function such as the valve opening/closing detection function and the indicator function. The air-operated valve 1C of the third embodiment, consequently, can use common parts and components except for the caps 26B and 26C to the air-operated valve 1A and selectively have an appropriate function at low costs.

Comparing with the conventional air-operated valve 1100 (see FIG. 31), the above effects are very remarkable. To be specific, when the conventional air-operated valve 1100 (see FIG. 31) is to provide the valve opening/closing detection function, the cap 1112 itself had to be replaced with another cap having a valve opening/closing detection sensor. This cap must have a hollow portion for the piston chamber 1114, which is costly to machine and incurs wasteful materials. The air-operated valve 1C of the third embodiment, on the other hand, each cap 26B, 26C has a simple cylindrical shape formed with the air supply and exhaust port 85 and the connection hole 103. This configuration needs less cutting works, thus reducing wasteful consumption of materials in the cutting works (see FIGS. 8, 10, 12 to 14). Accordingly, the air-operated valve 1C of the third embodiment can use the outer member 21, the inner member 20, and others common to the air-operated valves 1A and therefore can change the functions by only replacement of the cap 26A by the cap 26B or 26C that can be produced at low cost. According to the air-operated valve 1C of the third embodiment, therefore, parts needed for function changes can be produced at lower cost than in the conventional air-operated valve 1100 (see FIG. 31). It should be noted that each cap, 26B, 26C of the third embodiment are smaller than the conventional cap 1112 (see FIG. 31) and can be stocked in any places.

In the air-operated valve 1C of the third embodiment, the connection hole 103 of the cap 26B can threadedly accommodates any one of the valve opening/closing detection sensor 91, the stroke adjusting knob 92, and the opening/closing indicator 93 (see FIGS. 8, 10, 12). This makes it possible for a user to selectively attach/detach the valve opening/closing detection sensor 91, the stroke adjusting knob 92, and the opening/closing indicator 93 to change the function as needed.

In the air-operated valve 1C of the third embodiment, each cap 26B, 26C is provided with the air supply and exhaust port 85 to which the air supply and exhaust pipe is connected from above (see FIGS. 8, 10, 12 to 14). There is no need to take account of the interference of the air supply and exhaust pipe with peripheral parts. Thus, the freedom in design for installation of the air-operated valve 1C can be increased. The air-operated valve 1C needs no joint pipe on the periphery, saving an installation space of the air-operated valve 1C, so that a plurality of the air-operated valves 1C can be placed in closely-spaced relation.

Fourth Embodiment

Figure 15:
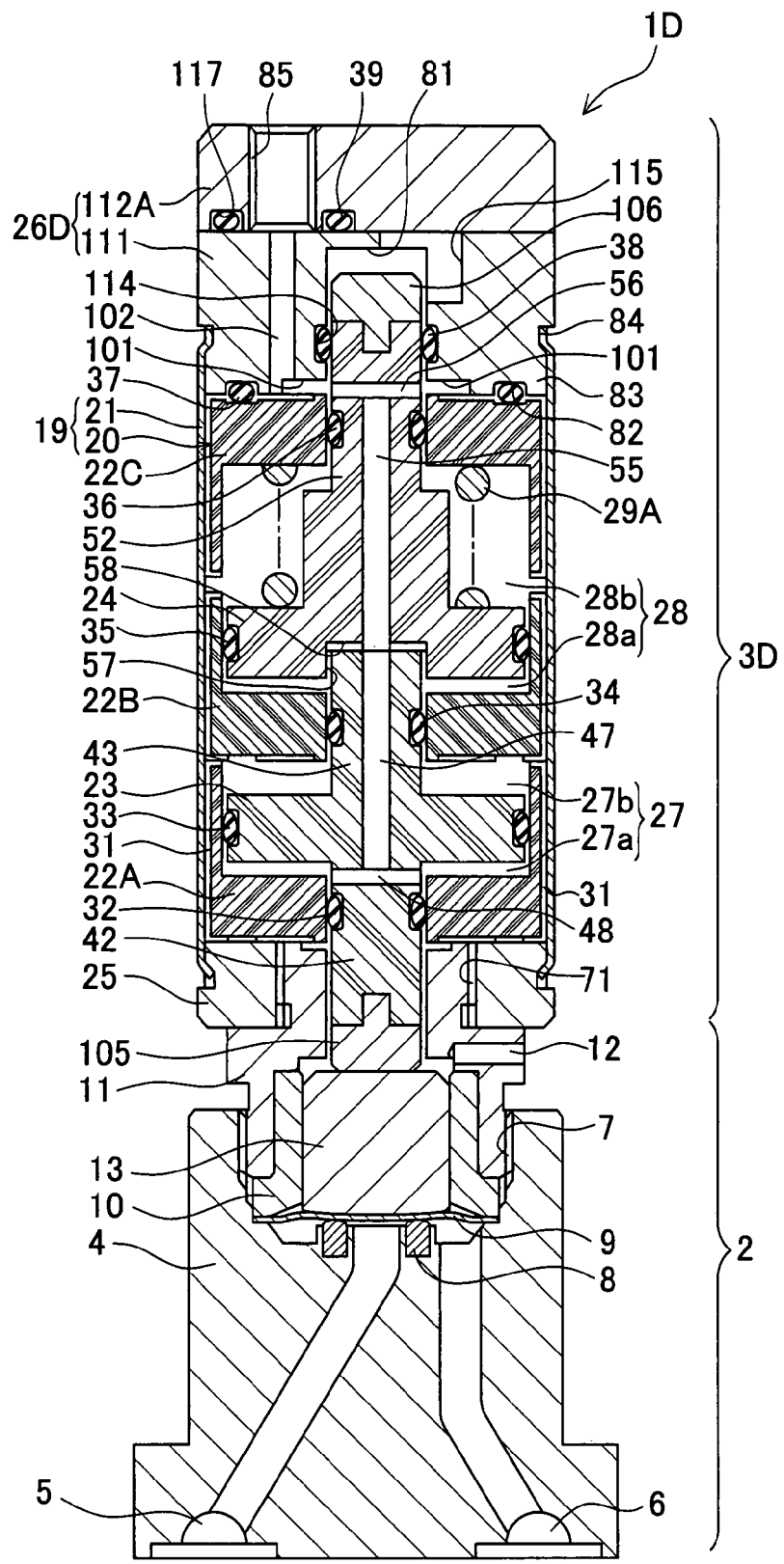
FIG. 15 is a sectional view of an air-operated valve of a fourth embodiment according to the present invention, in which a cap is provided with an air supply and exhaust port alone.
Figure 16:
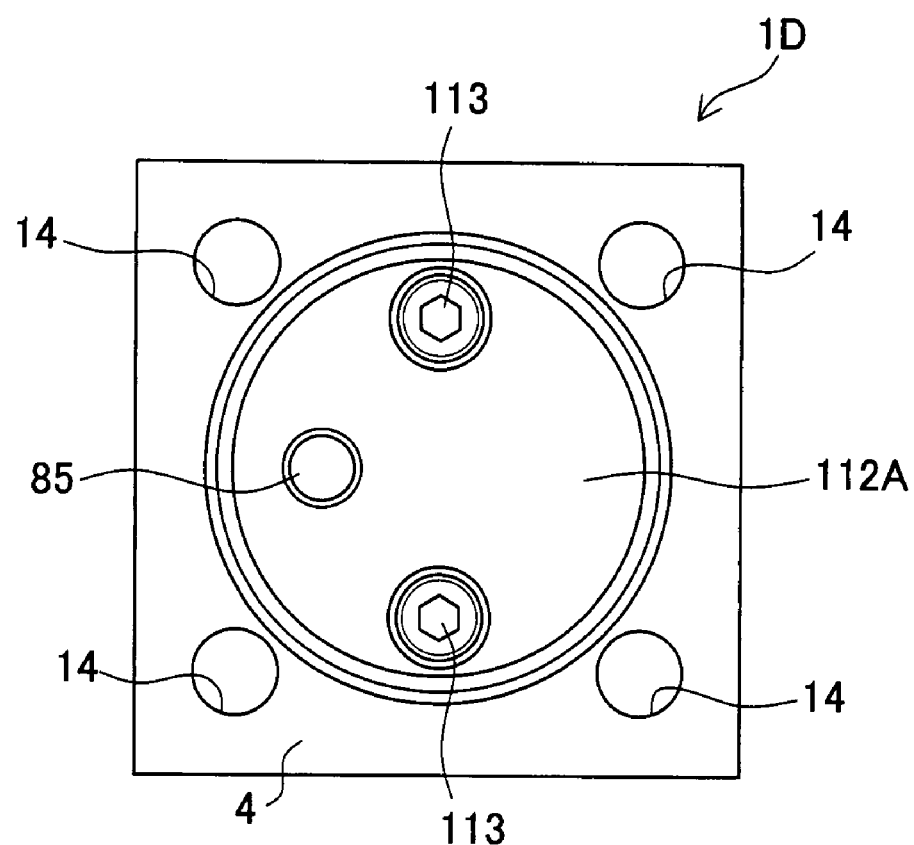
FIG. 16 is a plan view of the air-operated valve of FIG. 15.

A fourth embodiment of an air-operated valve according to the present invention will be described below referring to the drawings. FIG. 15 is a sectional view of an air-operated valve 1D of the fourth embodiment, showing a cap 26D formed with an air supply and exhaust port 85 alone. FIG. 16 is a plan view of the air-operated valve 1D of FIG. 15.

The air-operated valve 1D of the fourth embodiment is different from the air-operated valve 1C of the third embodiment in that the cap 26D is constituted of two separate parts. Accordingly, the following description will be focused on the differences from the third embodiment without repeating the same explanation. The identical parts and components to those in the third embodiment are given the same reference codes in the figures.

As shown in FIG. 15, the air-operated valve 1D include the cap 26D constituted of a fixed plate 111 which is an example of a "first plate" and an optional plate 112A which is an example of a "second plate", both plates 111 and 112A being fixed to each other with two bolts 113, 113 inserted from above as shown in FIG. 16.

The fixed plate 111 is formed with a cylindrical insertion hole 81 provided with a cylindrical recess 101 around an open end thereof. The fixed plate 111 is further formed with a bypass passage 102 extending through the fixed plate 111 so as to be continuous with the cylindrical recess 101. An annular mounting groove 82 for receiving the seal member 37 is formed in the end surface (the lower end surface) of the fixed plate 111 in such a manner as to surround the insertion hole 81, the cylindrical recess 101, and the bypass passage 102. The fixed plate 111 is also provided with a first connection hole 115 which partly overlaps the insertion hole 81 in misaligned relation to each other. The insertion hole 81 is formed, on its inner surface, with an annular mounting groove 114 for receiving a seal member 38, thereby providing a hermetically closed space between the piston rod 52 of the piston 24 and the inner surface of the insertion hole 81. The fixed plate 111 is also provided with a press-fit portion 83 and a swaging groove 84.

On the other hand, the optional plate 112A is provided with the air supply and exhaust port 85 in alignment with the bypass passage 102 of the fixed plate 111. The optional plate 112A is formed with a mounting groove 117 for receiving seal member 39 around an open end of the air supply and exhaust port 85.

In the above air-operated valve 1D, the outer member 21 is swaged on the fixed plate 111. The optional plate 112A is fixed to the fixed plate 111 with the bolts 113, 113, covering the first connection hole 115. Accordingly, the cap 26D including the optional plate 112A as shown in FIG. 15 has only the function of supplying and exhausting operation air through the air supply and exhaust port 85.

In the air-operated valve 1D of the fourth embodiment, the optional plate 112A is detachably fixed to the fixed plate with the bolts 113, 113. This configuration makes it possible to change the functions by replacing the optional plate 112A by another optional plate 112B or 112C.

Figure 17:
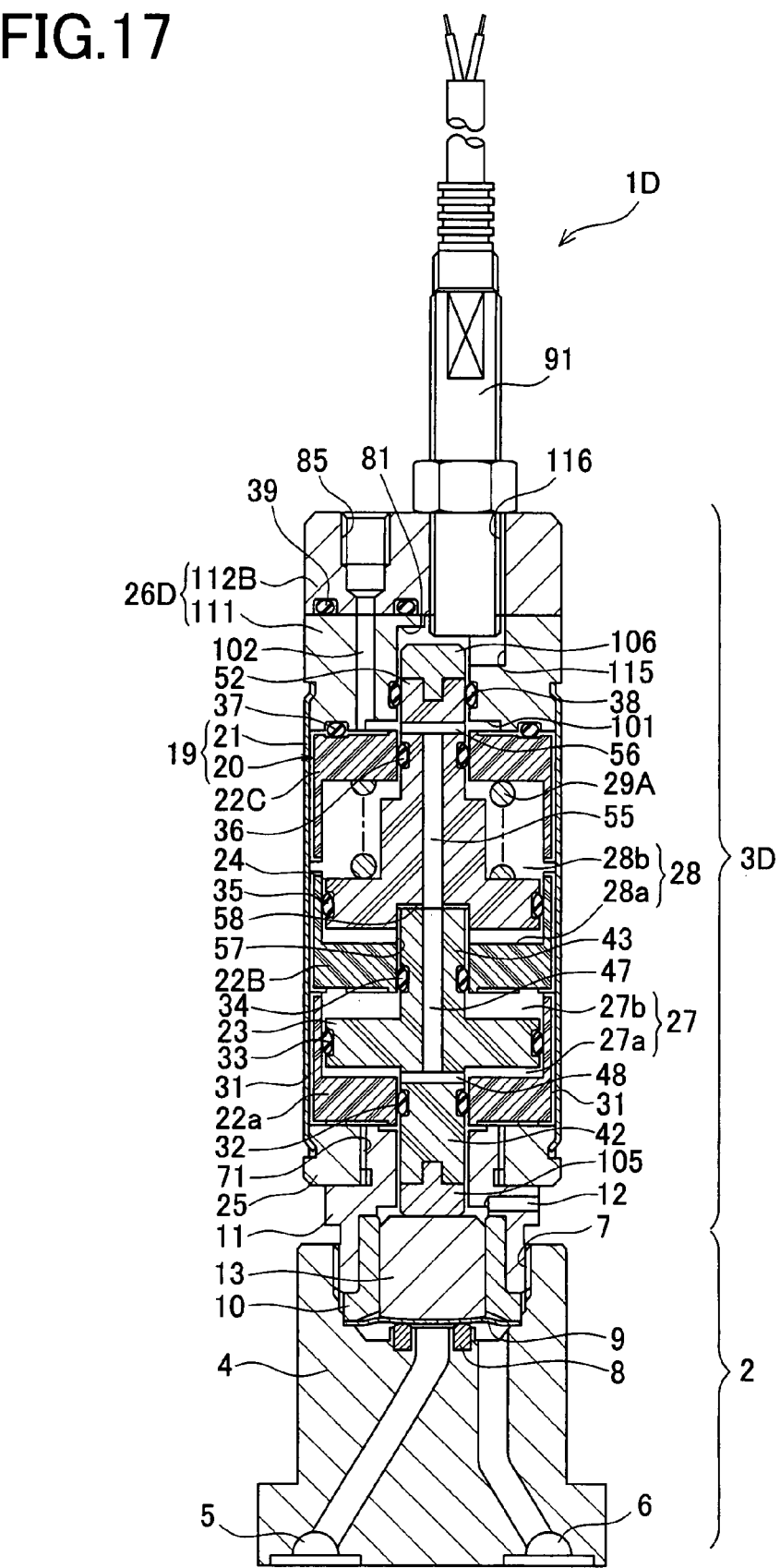
FIG. 17 is a sectional view of the air-operated valve of FIG. 15 including another optional plate provided with a valve open/close detection sensor.
Figure 18:
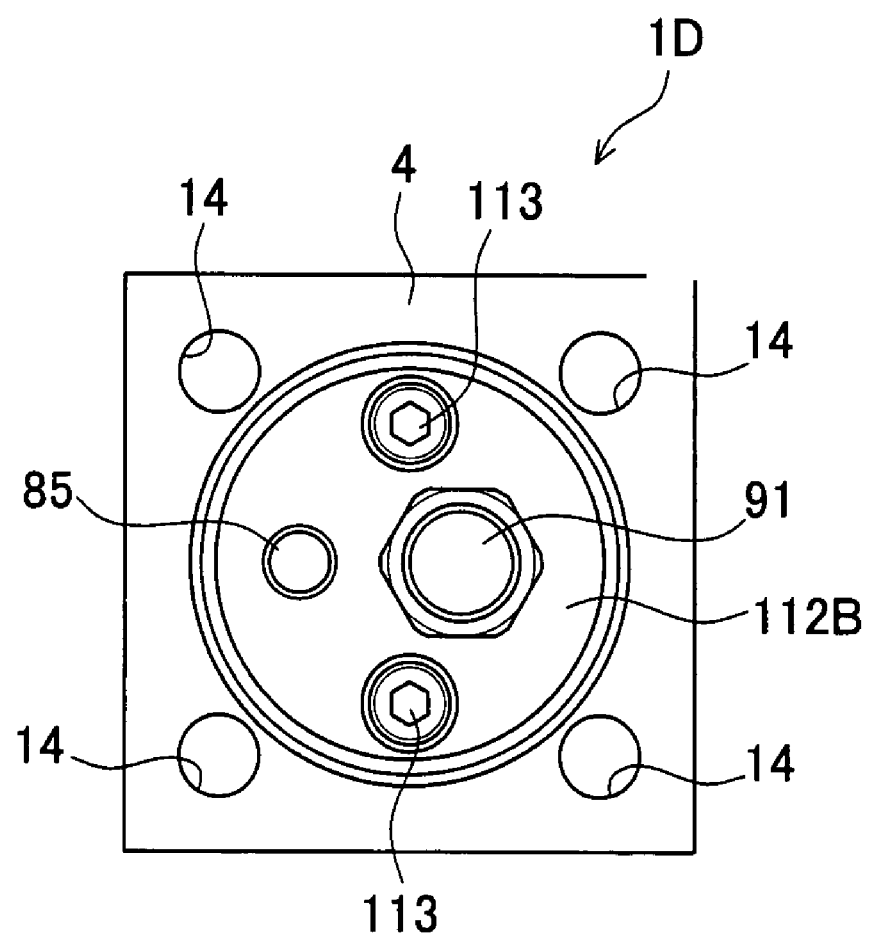
FIG. 18 is a plan view of the air-operated valve of FIG. 17.

FIG. 17 is a sectional view of the air-operated valve 1D of FIG. 15 including the optional plate 112B provided with the valve opening/closing detection sensor 91 instead of the optional plate 112A. FIG. 18 is a plan view of the air-operated valve 1D of FIG. 17.

As shown in FIGS. 17 and 18, the air-operated valve 1D is arranged such that the optional plate 112B is fixed to the fixed plate 111 with the bolts 113, 113. The optional plate 112B includes the air supply and exhaust port 85 at an off-center position to be aligned with the bypass passage 102 of the fixed plate 111. The optional plate 112B is further formed with a second connection hole 116 at an off-center position to be aligned with the first connection hole 115. The second connection hole 116 has an internally threaded surface (a female screw) in which the valve opening/closing detection sensor 91 is treadedly engageable. The thus constructed air-operated valve 1D can provide the valve opening/closing detection function in such a simple way that the bolts 113, 113 are demounted and the optional plate 112A is replaced by the optional plate 112B.

Figure 19:
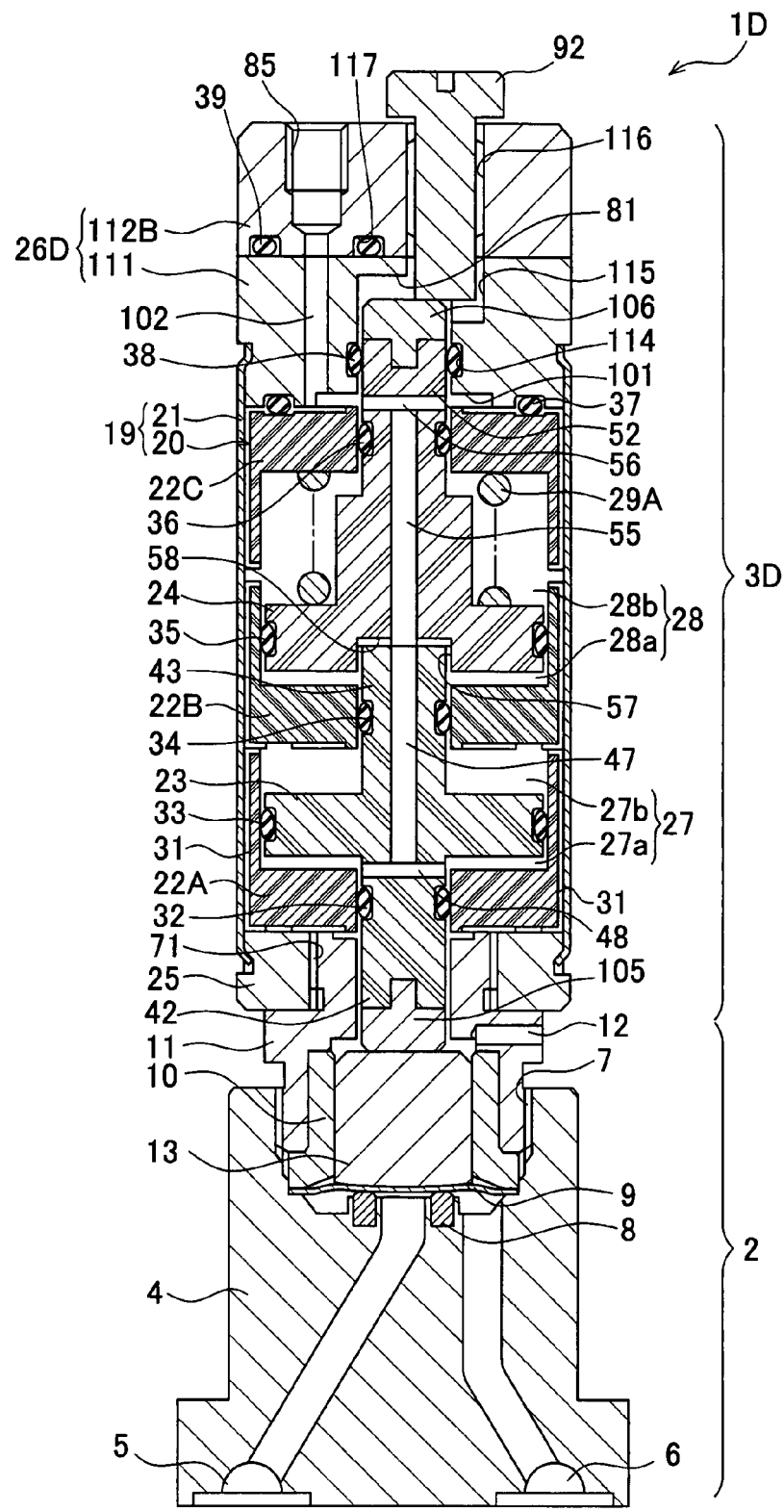
FIG. 19 is a sectional view of the air-operated valve of FIG. 17, in which a stroke adjusting knob is attached.
Figure 20:
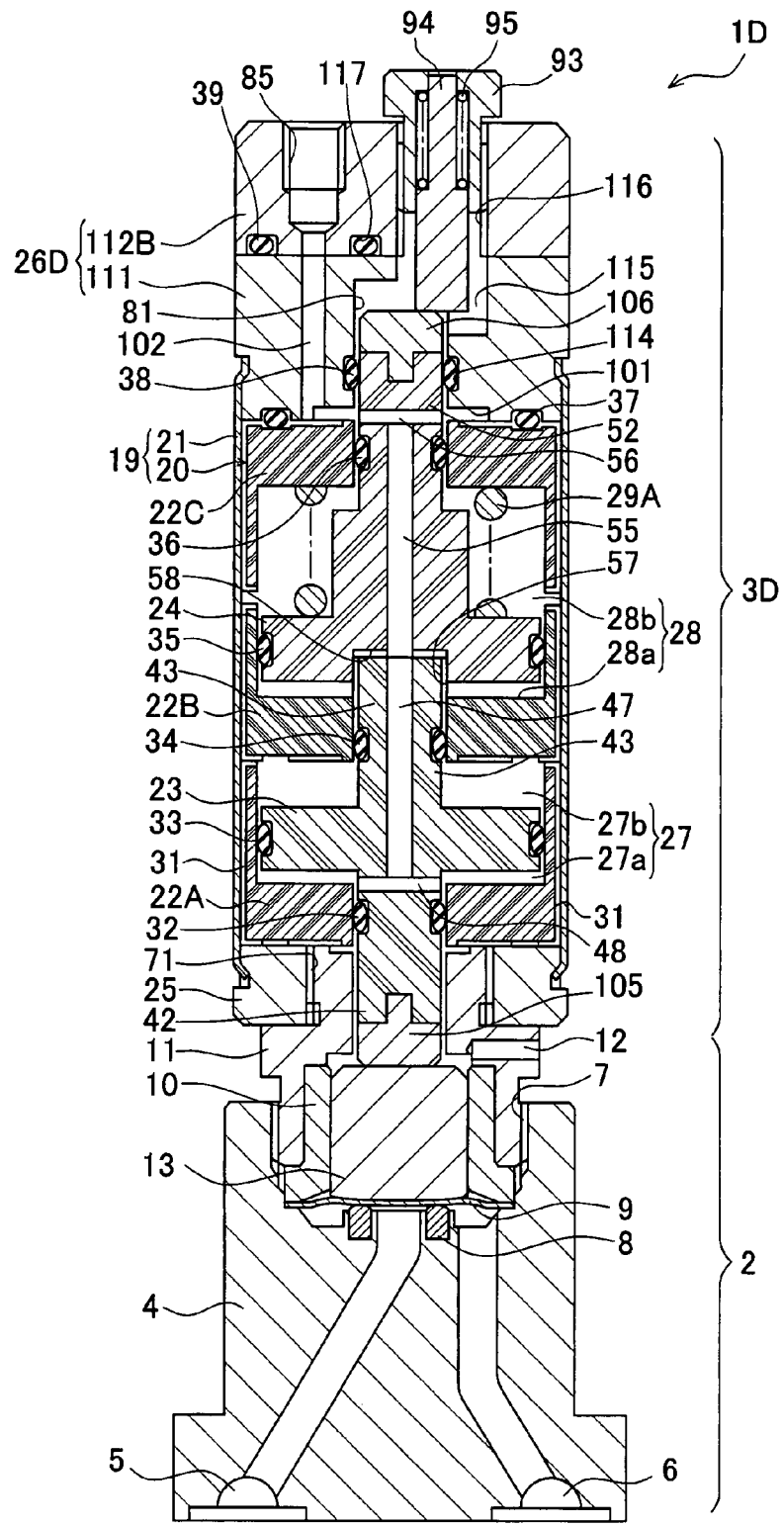
FIG. 20 is a sectional view of the air-operated valve of FIG. 17, in which an open/close indicator is attached.

FIG. 19 is a sectional view of the air-operated valve 1D of FIG. 17 in which the stroke adjusting knob is attached. FIG. 20 is a sectional view of the air-operated valve 1D of FIG. 17 in which the opening/closing indicator 93 is attached.

In the air-operated valve 1D of FIG. 17, the valve opening/closing detection sensor 91 is detachably engaged in the second connection hole 116. When the stroke adjusting knob 92 is threadedly engaged in the second connection hole 116 as shown in FIG. 19, instead of the sensor 91, therefore, the air-operated valve 1D can provide the stroke adjusting mechanism. When the opening/closing indicator 93 is threadedly engaged in the second connection hole 116 as shown in FIG. 20, the air-operated valve 1D can provide the indicator function that allows a user to visually recognize the valve open/closed state from outside.

Figure 21:
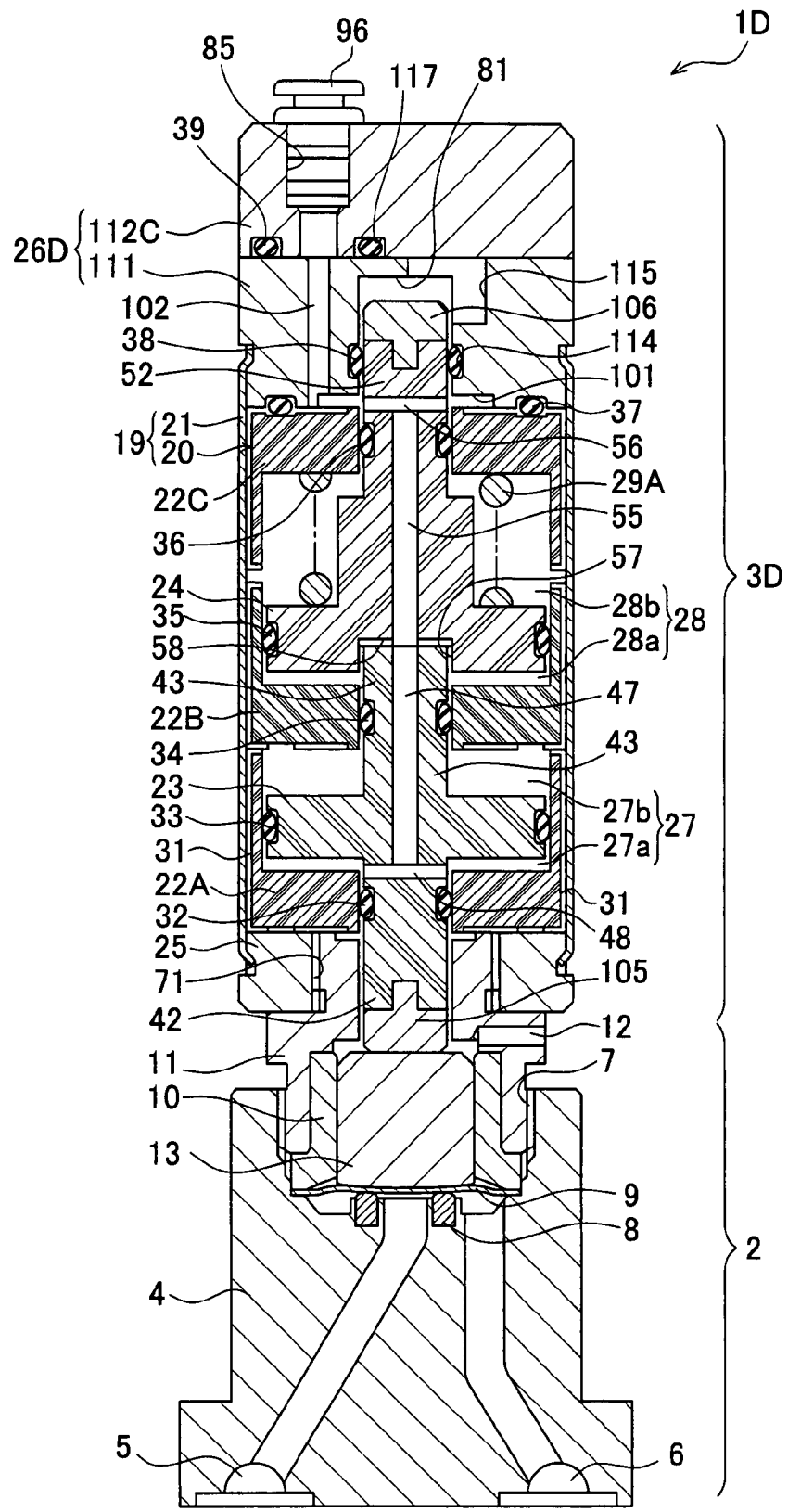
FIG. 21 is a sectional view of the air-operated valve of FIG. 15, including a cap having another optional plate attached with an instant joint.

FIG. 21 is a sectional view of the air-operated valve of FIG. 15, including the cap 26D having an optional plate 112C attached with the instant joint 96, instead of the optional plate 112A.

The optional plate 112C is provided with an air supply and exhaust port 85 formed shorter in depth than in the optional plate 112A, forming a shoulder on which the instant joint 96 abuts to be set in the port 85. The air-operated valve 1D of FIG. 21 including the optional plate 112C enables one-touch connection of an air supply and exhaust pipe to the air supply and exhaust port 85.

<Operations and Effects>

In the air-operated valve 1D of the fourth embodiment in which the pistons are caused to slide in the cylinder 19 by use of the operation air to exert the driving force on the valve section 2, the cap 26D closing the upper end of the cylinder 19 is constituted of separate parts (the fixed plate 111 and the optional plate 112A, 112B, or 112C) which are detachably connected to each other with the bolts 113, 113 (see FIGS. 15, 17, 19 to 21). In the optional plate 112A, 112B, or 112C which is one of the separate parts, an intended fluid control member such as the instant joint 96, the valve opening/closing detection sensor 91, the stroke adjusting knob 92, and the opening/closing indicator 93 is attached (see FIGS. 15, 17, 19 to 21). Accordingly to the air-operated valve 1D of the fourth embodiment, consequently, the optional plates 112A, 112B, 112C can be replaced with one another while the fixed plate 111 remain fixed to the outer member 21 to add or change the function. In the air-operated valve 1D of the fourth embodiment, furthermore, the fixed plate 111 can also be used in common, achieving a further reduction in cost.

In the air-operated valve 1C of the aforementioned third embodiment, particularly, the cap 26C attached with the instant joint 96 (see FIG. 21) and the cap 26B attached with the valve opening/closing detection sensor 91 or others (see FIGS. 17, 19, 20) could not be replaced with each other after assembly of the air-operated valve 1D in a place for practical use. By simple replacement of the optional plates 112B, 112C, the air-operated valve 1D of the fourth embodiment can be easily configured as one of the configuration using the instant joint 96 and the configuration using the valve opening/closing detection sensor 91 or the like even in a place for practical use.

Furthermore, in the air-operated valve 1D, the optional plate 112B is used to selectively connect the valve opening/closing detection sensor 91, the stroke adjusting knob 92, or the opening/closing indicator 93 to the second connection hole 116 (see FIGS. 17, 19, 20). The valve opening/closing detection sensor 91, the stroke adjusting knob 92, or the opening/closing indicator 93 is required to be replaced with a desired one to change the function. Thus, the optional plate 112B no longer needs to be replaced with another.

In the air-operated valve 1D of the fourth embodiment, the bolts 113, 113 are tightened from above to fix the optional plate 112A, 112B, or 112C to the fixed plate 111 (see FIG. 16, 18). This makes it easy to facilitate the replacing works for the optional plates 112A, 112B, 112C even where the air-operated valve 1D is incorporated in a manufacturing line.

It should be noted that the present invention is not limited to the above embodiments and may be embodied in other specific forms without departing from the essential characteristics thereof.

(1) For instance, the above embodiments are described about the two-tiered air-operated valve 1A. As an alternative, the present invention may be configured as a three-tiered air-operated valve 1E shown in FIG. 22, in which four inner parts 22A, 22B, 22C, 22D identical in shape are stacked and fixed in the outer member 21, forming three piston chambers 27, 28, 121. In this case, a protruding piston 122 is interposed between the pistons 23 and 24. This piston 122 is internally formed with a main passage 123, a fitting recess 124 around an open end of the main passage 123, and a communication passage 125 in an inner circumferential surface of the fitting recess 124. This configuration allows communication between a pressure chamber 121a of the piston chamber 121 and the air supply and exhaust port 85. It should be noted that the number of pistons 122 interposed between the pistons 23 and 24 may be changed to configure a four-tiered or more multiple-tiered air-operated valve.

Figure 23:
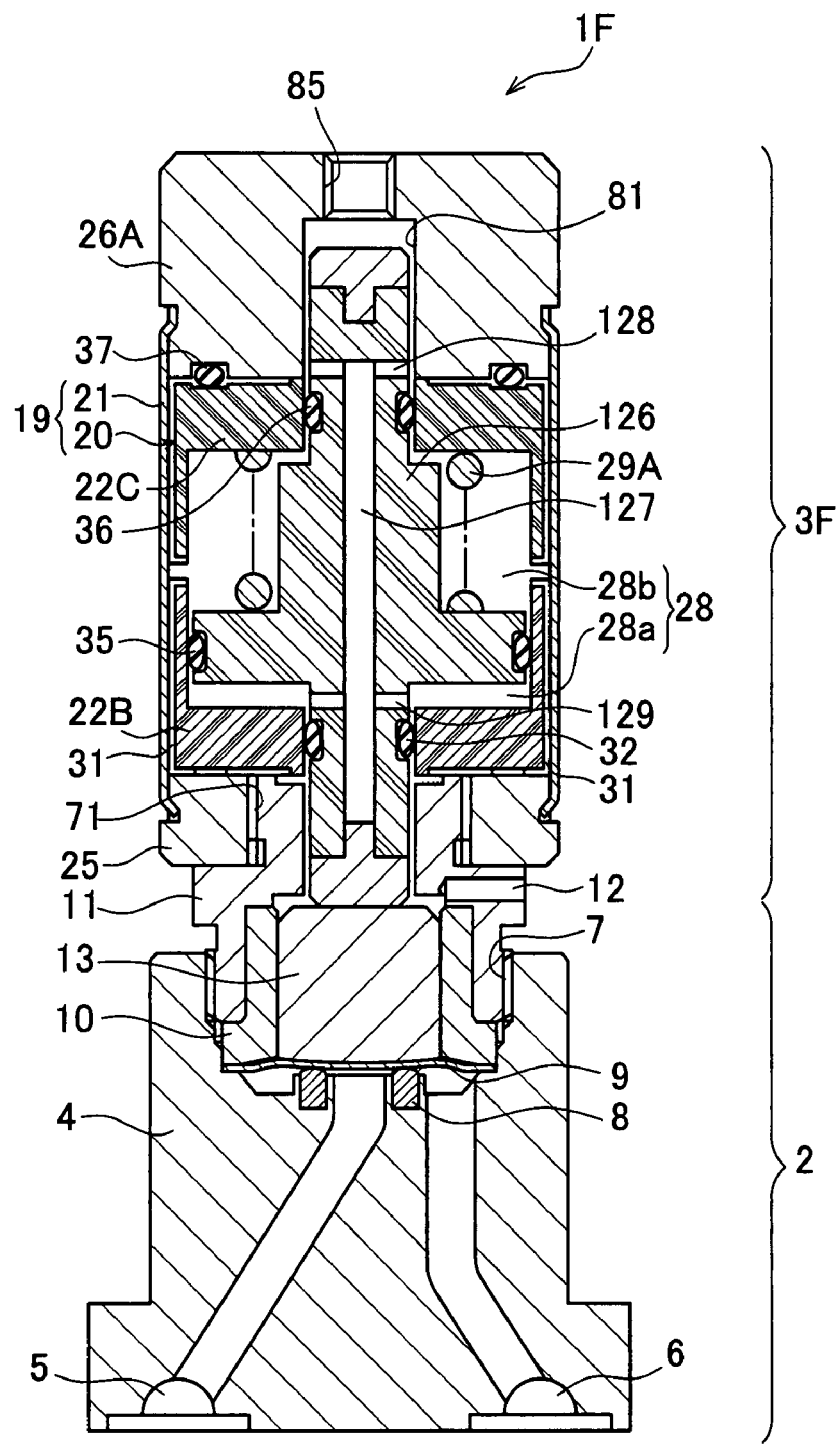
FIG. 23 is a sectional view of another example of the air-operated valve according to the present invention, which is embodied as a normally closed single-tiered air-operated valve, showing an internal configuration thereof.

As another alternative, the present invention may be configured a single-tiered air-operated valve 1F as shown in FIG. 23, in which two inner parts 22B, 22C identical in shape are stacked and fixed in the outer member 21, forming a single piston chamber 28. In this case, two branch passages 128, 129 are formed in a piston 126 to communicate with each other through a main passage 127. This configuration allows communication between the air supply and exhaust port 85 and a pressure chamber 28a of the piston chamber 28 through the branch passage 128, the main passage 127, and the branch passage 129.

As shown in the aforementioned air-operated valves 1E, 1F, a single- or multiple-tiered air-operated valve can be provided as intended by simply changing the number of common inner parts 22A, 22B . . . . The common parts also can be used, achieving a reduction in cost.

Figure 24:
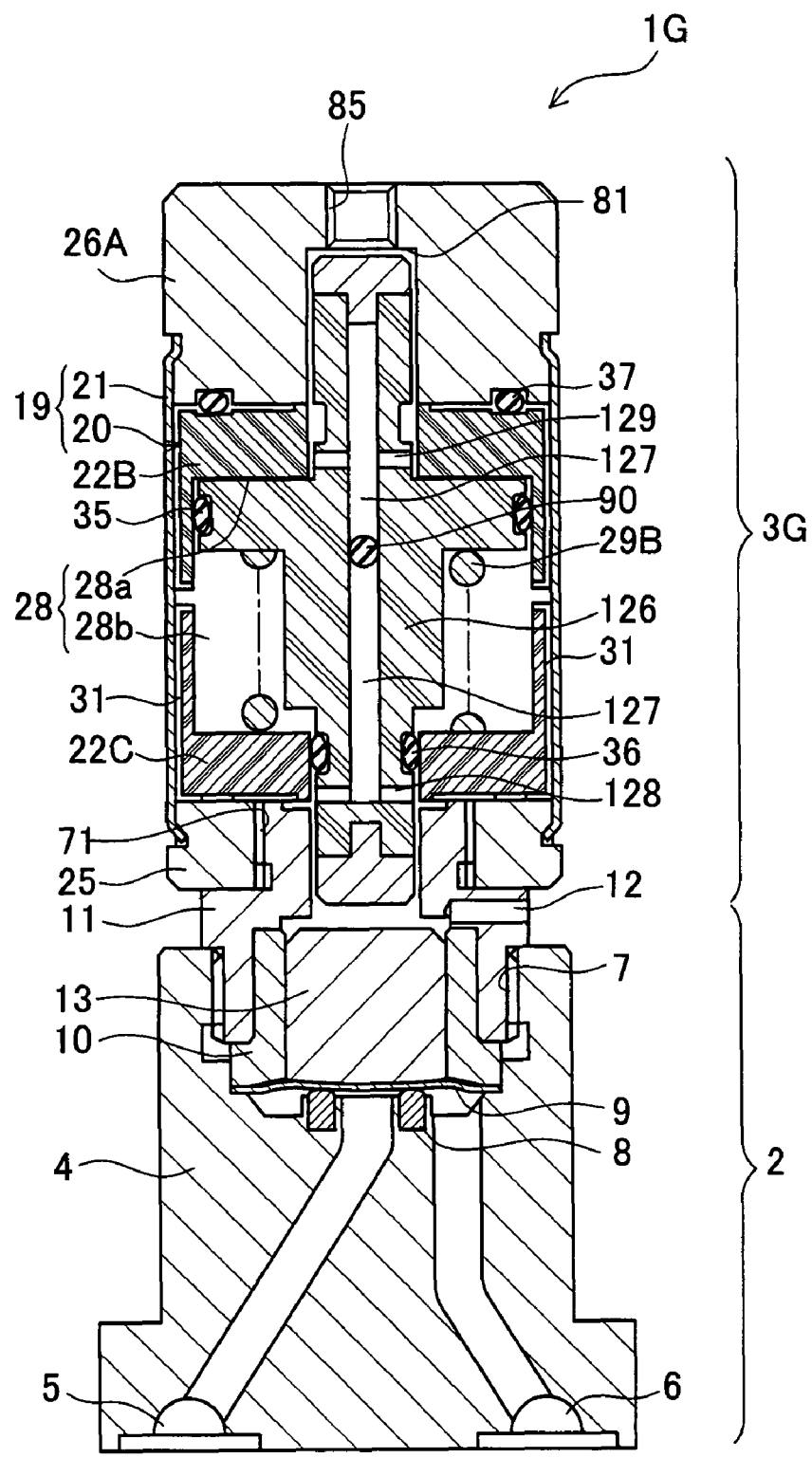
FIG. 24 is a sectional view of another example of the air-operated valve of FIG. 23, which is configured in a normally open single-tiered air-operated valve.

As another alternative, the present invention may be configured as an air-operated valve 1G shown in FIG. 24, in which the compression spring 29B is used in place of the compression spring 29A shown in FIG. 23, the seal member 32 is removed, the stopper 90 is fitted in the main passage 127 of the piston 126, and the inner parts 22B, 22C are loaded in the outer member 21 so that the inner parts 22B, 22C are arranged in an axially reversed orientation from in FIG. 23 as well as the piston 126. In this way, the normally closed valve can be transformed to the normally open valve. Also in this example, the parts except for the compression springs 29A, 29B, and the seal member 32 may be used in common in both valve configurations be transformed from the normally closed valve to the normally open valve and vice versa, achieving a reduction in cost.

Figure 22:
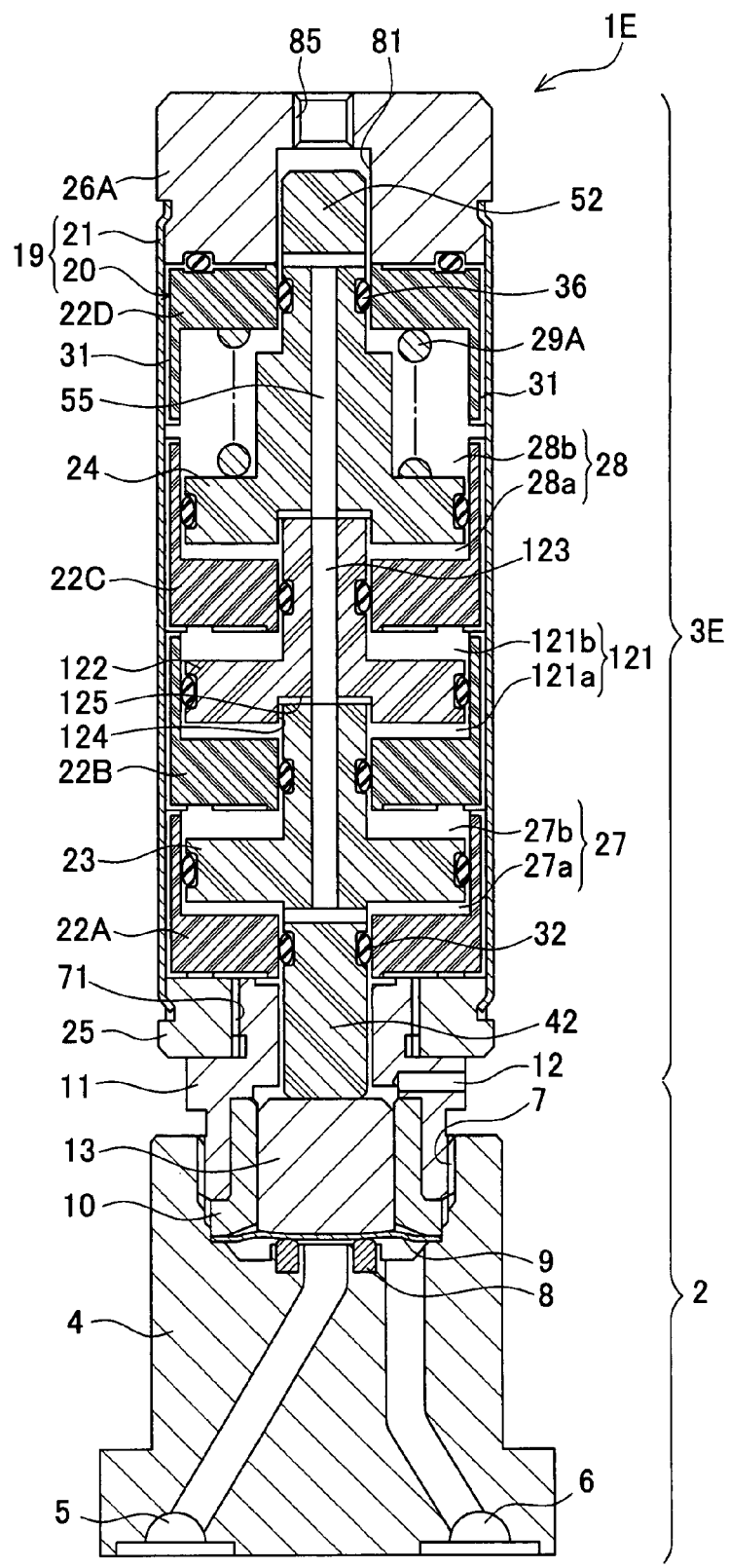
FIG. 22 is a sectional view of another example of the air-operated valve according to the present invention, which is embodied as a normally-closed three-tiered air-operated valve, showing an internal configuration thereof.

The air-operated valve 1E shown in FIG. 22 may also transformed from the normally closed valve to the normally open valve by removing the seal member 32, replacing the compression spring 29A with the compression spring 29B, and fitting the stopper 90 in the main passage 55 of the piston 24 and loading the pistons 23, 24, 122 together with the inner parts 22A, 22B, 22C, 22D in integrally reversed orientation into the outer member 21.

Figure 25:
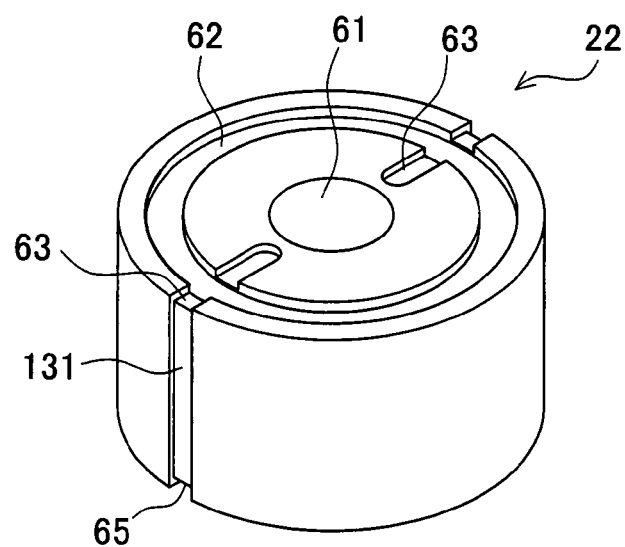
FIG. 25 is a perspective view of another example of the inner part of the air-operated valve of the present invention.
Figure 26:
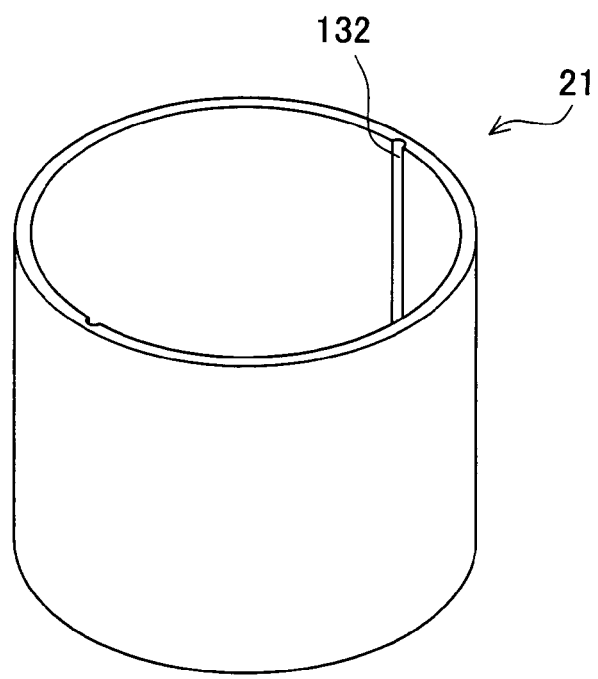
FIG. 26 is a perspective view of another example of the outer part of the air-operated valve of the present invention.

(2) In the above embodiments, each inner part 22A, 22B, 22C is formed with the D-cut passages 64 on the outer periphery to form the conducting passages 31 between each inner part 22A, 22B, 22C and the outer member 21. As an alternative to the D-cut passages 64, a plurality of conducting grooves 131 having a rectangular section may be formed on the outer periphery of each inner part 22A, 22B, 22C as shown in FIG. 25. In this case, the conducting passages 31 are defined between the conducting grooves 131 of each inner part 22A, 2B, 22C and the inner surface of the outer member 21. As an alternative, instead of the D-cut passages 64 on the outer periphery of each inner part 22A, 22B, 22C, a conducting groove 132 may be formed in the inner surface of the outer member 21 as shown in FIG. 26 to form the conducting passages 31 between each inner part 22A, 22B . . . and the outer member 21.

The conducting grooves 132 can be formed at the same time of a drawing or extruding process for the outer member 21. The machining of the conducting grooves 132 is therefore inexpensive. Further, another alternative is to form the conducting grooves 131 in each inner part 22A, 22B, 22C and also form the conducting grooves 132 in the outer member 21.

(3) In the above embodiment, for example, both ends of the outer member 21 are press-fitted and swaged on the base 25 and the cap 26A respectively.

Figure 27:
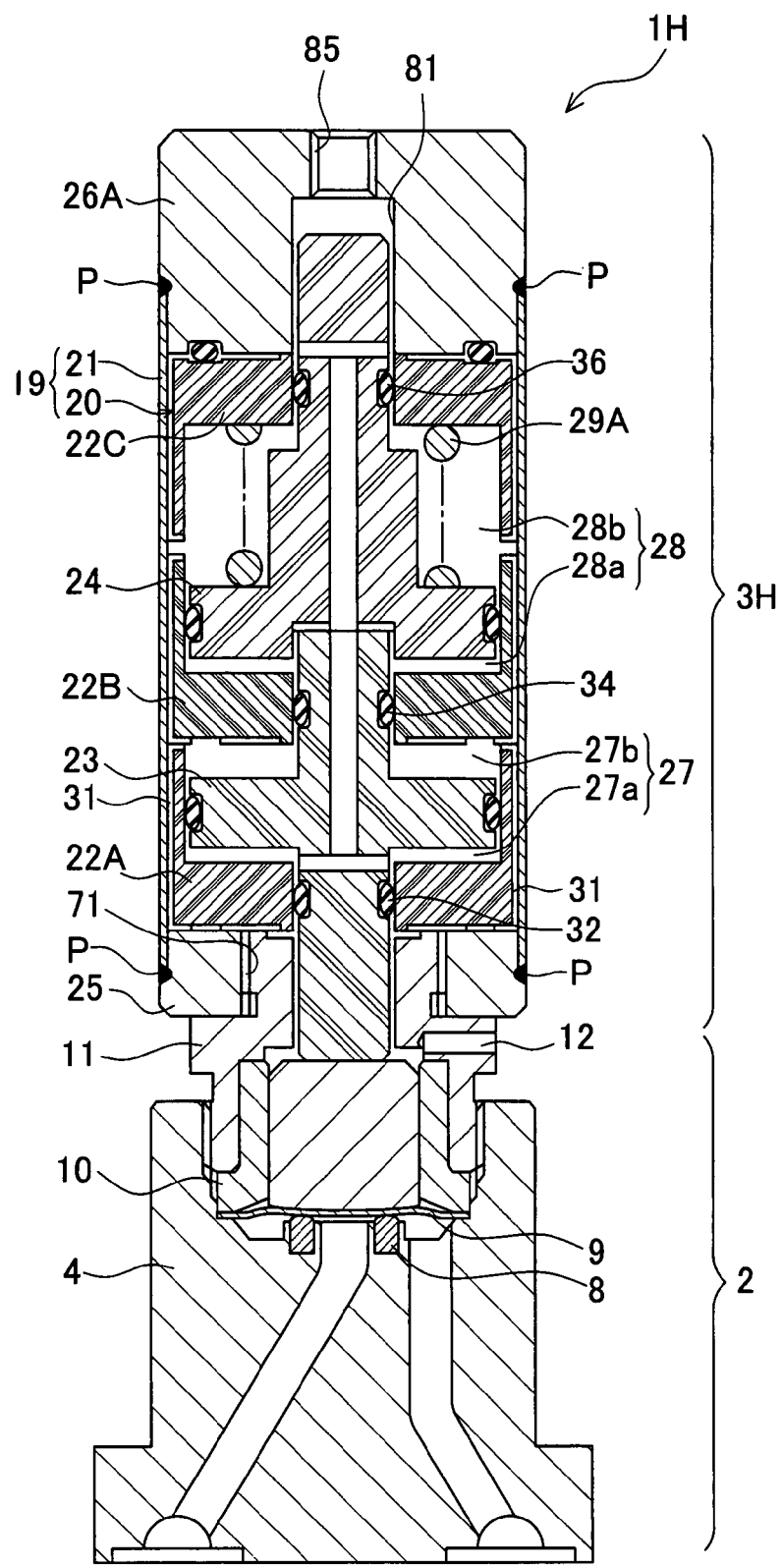
FIG. 27 is a sectional view of another example of the air-operated valve, including another coupling structure for coupling the outer member to the cap and the base.

As an alternative to such configuration, an air-operated valve 1H shown in FIG. 27 may be adopted in which both ends of the outer member 21 are press-fitted and then welded on the base 25 and the cap 26A respectively as illustrated as portions P in FIG. 27. In this configuration, the base 25 and the cap 26A can be tightly fixed to the outer member 21, reliably preventing fluid leakage.

Figure 28:
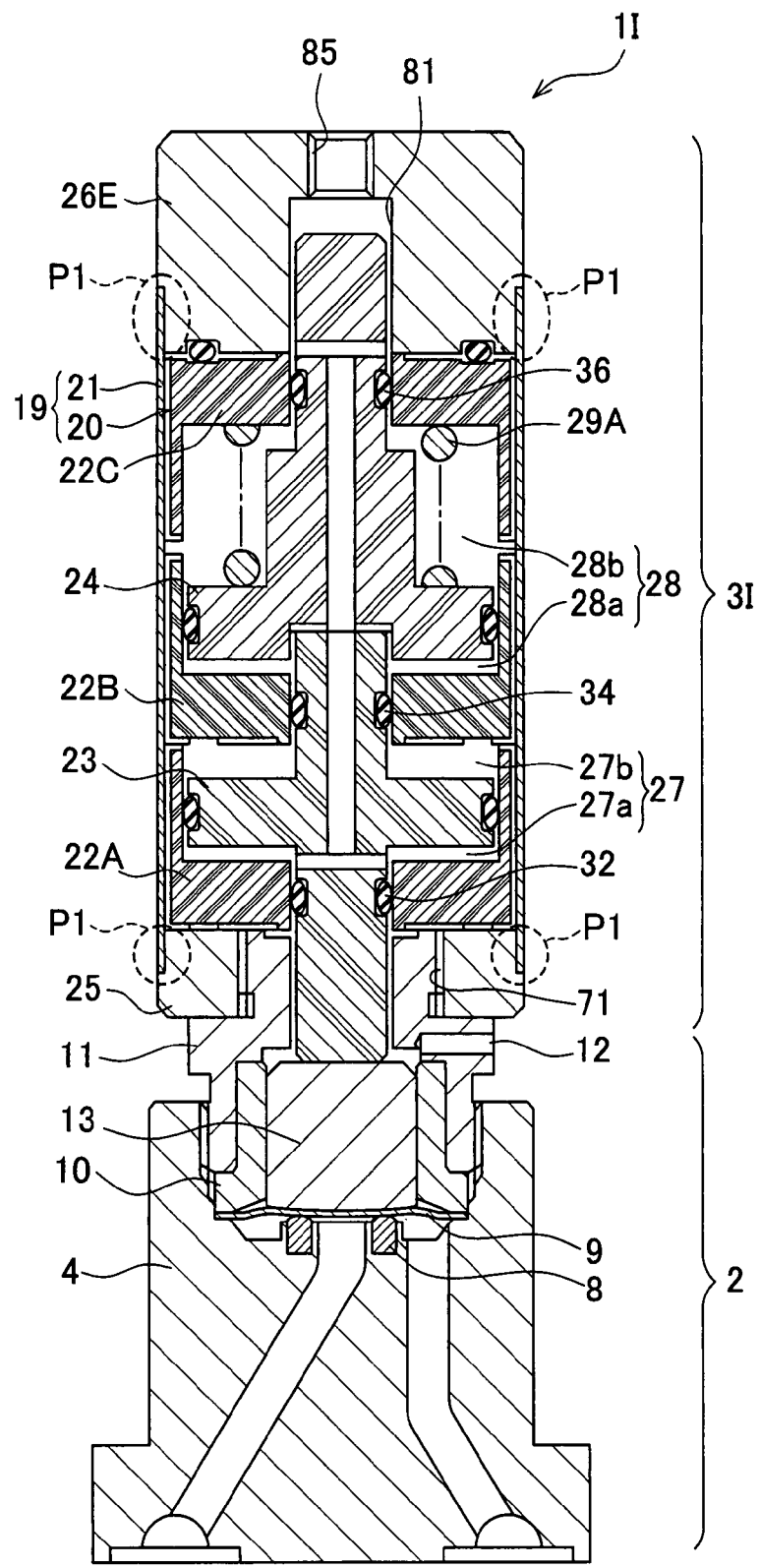
FIG. 28 is a sectional view of another example of the air-operated valve, including another coupling structure for coupling the outer member to the cap and the base.

As another alternative, an air-operated valve 1I shown in FIG. 28 may be adopted in which the base 25 and the cap 26E are not provided with the swaging grooves 74 and 84, both ends of the outer member 21 are merely press-fitted or bonded on the base 25 and the cap 26E or the press-fitted portions are bonded with adhesive or the like to fix the outer member 21 to the base 25 and the cap 26E. This configuration can eliminate a machining work needed to form the swaging grooves 74, 84.

Figure 29:
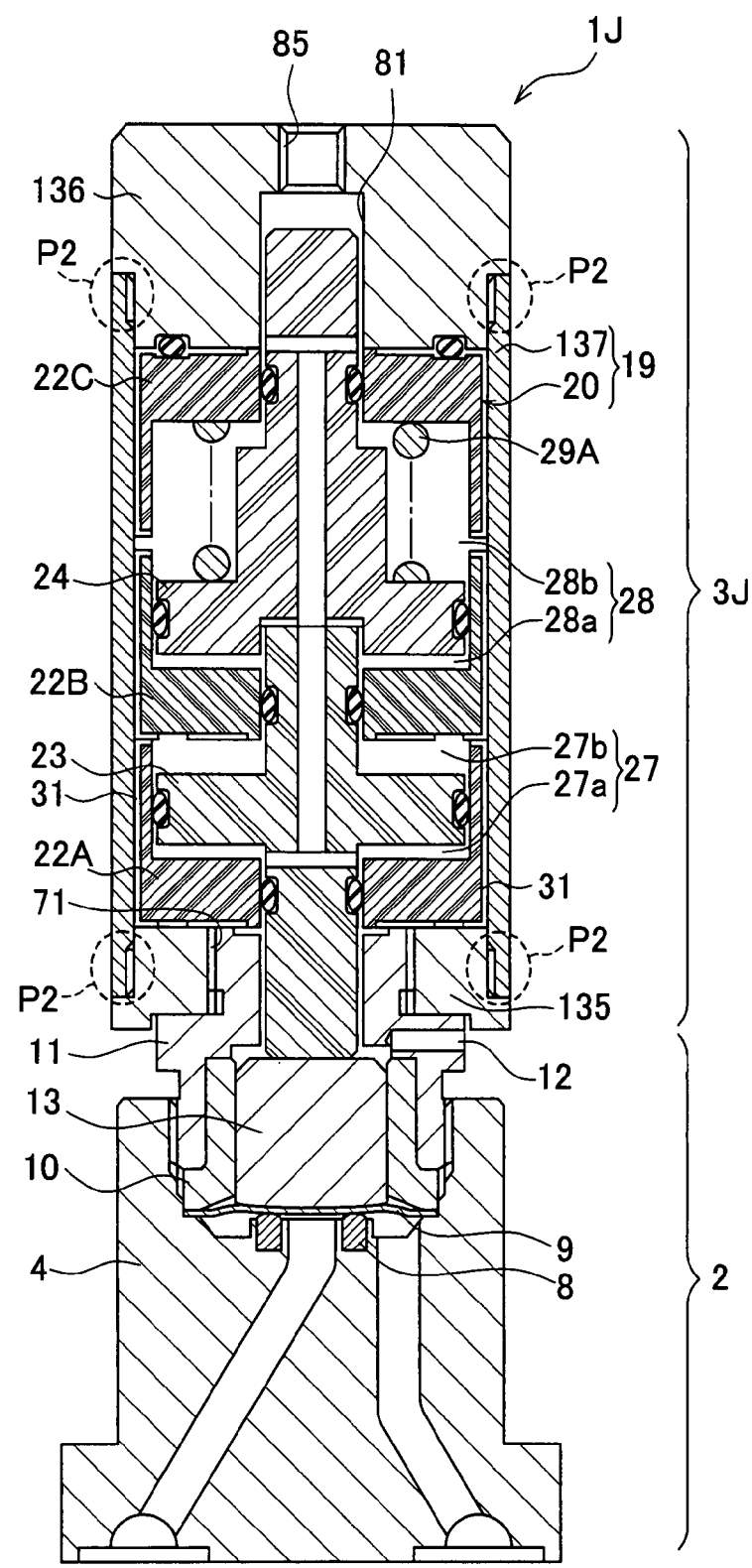
FIG. 29 is a sectional view of another example of the air-operated valve, including another coupling structure for coupling the outer member to the cap and the base.
Figure 30:
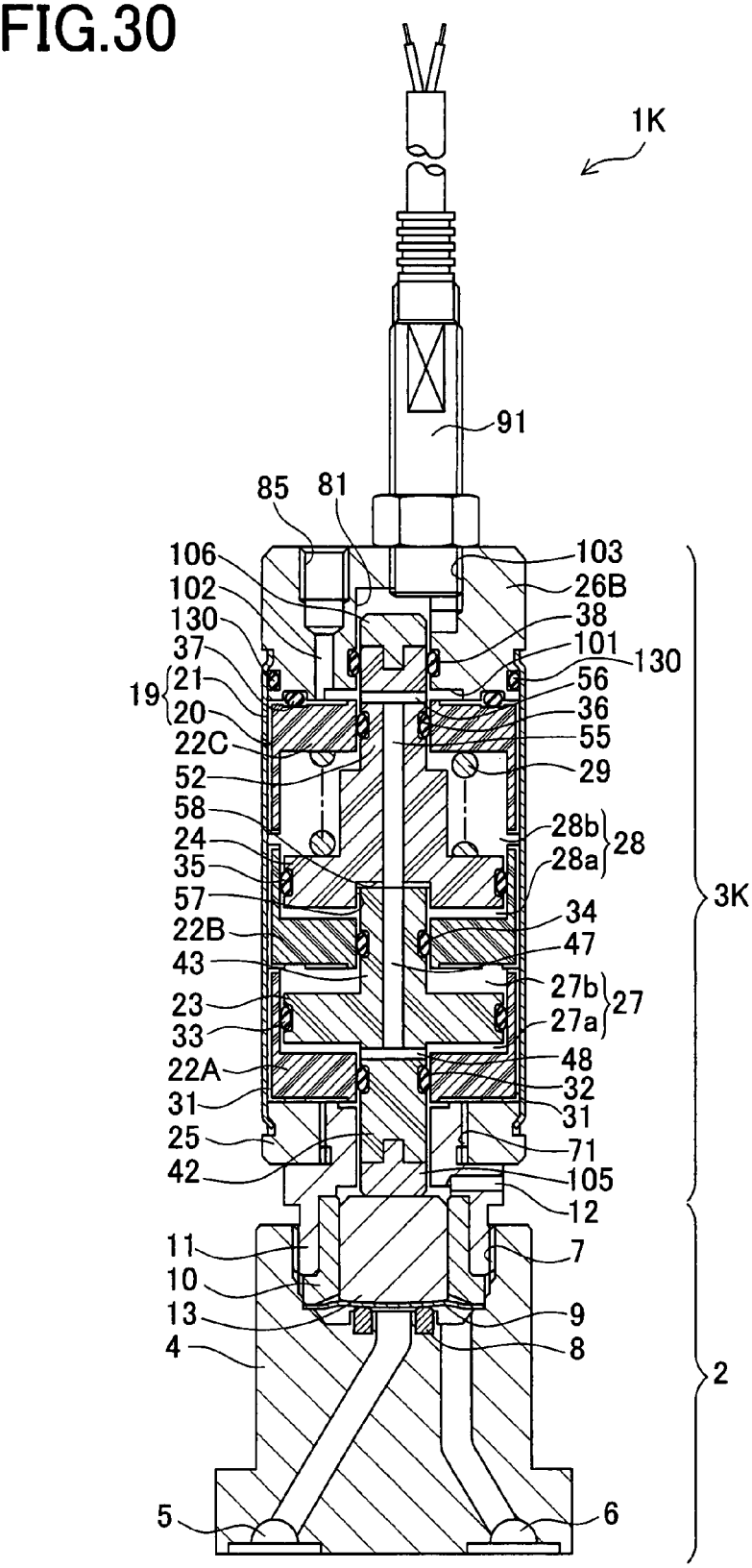
FIG. 30 is a sectional view of another example of the air-operated valve of the present invention, in which an O-ring (a frictional member) is fitted in a press-fit portion.

As another alternative, an air-operated valve 1J shown in FIG. 29 may be adopted in which a base 135 and a cap 136 are formed with externally threaded surfaces (male screws) respectively, while both open ends of an outer member 137 are formed with an internally threaded surface (a female screw) as shown in portions P2 in FIG. 29, so that both ends of the outer member 137 are threadedly engaged with the base 135 and the cap 136. This configuration needs machining of the screw portions, resulting in an increase in cost, but allows easy detachment of the base 135 and the cap 136 from the outer member 137 because both ends of the outer member 137 are not press-fitted on the base 135 and the cap 136. Thus, those base 135, cap 136, and outer member 137 can be reused.

(4) In the above embodiment, all of the inner parts 22A, 22B, 22C and the pistons 23, 24 are resin molded parts, but they may be aluminum die-cast molded parts, lost-wax molded parts, and others which can be manufactured in less cutting works and thus at low costs. When the air-operated valve 1A, 1B, 1C, or 1D is to be used for controlling high-temperature control fluid or is to be heated, the temperature of the entire valve may exceed 80° C. In such a case, resin molded parts are inappropriate for the inner parts 22A, 22B, 22C and the pistons 23, 24. Accordingly, the inner parts 22A, 22B, 22C and the pistons 23, 24 may be made as metal parts such as aluminum die-cast molded parts or lost-wax molded parts to make the air-operated valve 1A, 1B, 1C, or 1D usable even in such environments as the temperature of the entire valve is likely to exceed an upper temperature limit, e.g., 80° C.

(5) In the above embodiments, the inner parts 22A, 22B, 22C are identical in shape, but they may be designed having different shapes according to respective mounting places in the outer member 21. Specifically, the inner part 22B may be designed having thick closed end walls to serve as partition plates for partitioning the first and second piston chambers 27, 28. On the other hand, the inner parts 22A, 22C whose closed end walls are supported by the base 25 and the cap 26A, 26B, or 26C for enhancing the strength may be designed having thin closed end walls. The inner parts 22A, 22B, 22C may be changed in shape according to respective intended use, which can avoid wasteful consumption of materials for the inner parts 22A, 22B, 22C. Further, since unnecessary portions of the inner parts 22A, 22B, 22C are thin as above, the valve can be reduced in size and weight.

(6) In the above embodiments, the outer member 21 is a metal pipe, but may be a resin molded part. In this case, the outer member 21 is formed with a large wall thickness for ensuring pressure resistance, which tends to cause an increase in size of the valve. However, such outer member 21 may be produced easily by injection molding, for example, contributing to a reduction in cost. This also can contribute to a reduction in weight.

(7) In the above embodiments, the branch passages 48 and 56 are formed having a rectangular section. The branch passage has only to have a section larger in width in a direction intersecting with (perpendicular to) the main passage than in height in an axial direction to ensure a sufficient passage sectional area. The section of each branch passage 48, 56 may have a horizontally long elliptic shape or a shape defined by a plurality of circles combined in partially superimposed relation in a diameter direction of a piston rod.

(8) In the above third and fourth embodiments, the pistons 23 and 24 are provided with the metal parts 105 and 106 respectively (see FIGS. 8, 17, and others). As an alternative, the metal part may be attached to only the end of either piston 23, 24 which abuts on the stem 13 as long as the pistons 23, 24 do not come into contact with other parts.

(9) In the above embodiments, the air-operated valves 1A, 1B, 1C, 1D have a cylindrical outer shape, but may have a polygonal outer shape. For this polygonal shape case, the outer member 21 may be designed to have a polygonal outer surface and a cylindrical inner surface for receiving the inner parts 22 or to have polygonal outer and inner surfaces if the inner parts 22 have polygonal outer surfaces. In either case, the outer member 21 has a pipe shape and thus can be easily produced by cutting out a polygonal pipe made by a drawing or extruding process by a predetermined length.

(10) In the above embodiments, the driving force of the actuator section 3A, 3B, or 3C is transmitted to the diaphragm 9 through the stem 13. As an alternative, the diaphragm 9 may be placed in direct contact with the end of the piston 23 or 24 without interposing the stem 13) to directly transmit the driving force to the diaphragm 9.

In the above embodiments, the diaphragm 9 is of a film shape but another diaphragm having a different configuration from the diaphragm 9 may be adopted. For example, a diaphragm including a main body and a web portion radially extending from the main body may be adopted. In this case, the piston 23 or 24 may be coupled to the main body of the diaphragm without a stem.

(11) In the above embodiments, the air-operated valves 1A to 1D are configured as a two-way valve for selectively allowing and interrupting communication between the primary-side port 5 and the secondary-side port 6. As an alternative, the configurations of the actuators 3A, 3B, 3C described in the above embodiments may be applied to a multiway valve such as a three-way valve. The air-operated valves 1A to 1D in the above embodiments are diaphragm valves but may be poppet valves.

What is claimed is:

1. An air-operated valve comprising:
   a piston;
   a cylinder in which the piston is allowed to slide;
   a valve section to be driven by sliding movement of the piston, wherein:
   the cylinder includes:
      an outer member having a hollow portion; and
      an inner member loaded in the hollow portion of the outer member, defining a piston chamber in which the piston is allowed to slide,
   the air-operated valve is adapted to be selectively constructed in one of a normally closed configuration and a normally open configuration,
   the piston has a piston assembly comprising a first piston rod, a second piston rod and a piston portion,
   the first piston rod and the second piston rod are arranged in opposite directions to each other with respect to the piston portion so that the first piston rod is movable toward and away from the valve section in the normally closed configuration and the second piston rod is movable toward and away from the valve section in the normally open configuration,
   the first piston rod and the second piston rod include an air passage axially extending in a center of the first piston rod and the second piston; rod, and
   the piston assembly is arranged such that a seal member is attached to each of the first piston rod and the second piston rod when the air-operated valve is in the normally closed configuration, while the seal member is attached to the second piston rod but no seal member is attached to the first piston rod when the air-operated valve is in the normally open configuration; and
   a closing plate provided with an air port for air supply, the closing plate being used in both the normally closed configuration and the normally open configuration.

2. The air-operated valve according to claim 1, wherein the piston assembly includes:
   a first branch passage formed in the first piston rod to extend in a direction perpendicular to a central axis of the first piston rod;
   a second branch passage formed in the second piston rod to extend in a direction perpendicular to a central axis of the second piston rod;
   a bypass passage formed in the first and second piston rods to extend in a direction of the central axes of the first and second piston rods to provide communication between the first branch passage and the second branch passage; and
   a blocking member placed in the bypass passage in the normally open configuration to block the flow between the first branch passage and the second branch passage.

3. The air-operated valve according to claim 1, further comprising one of a first urging member mounted in the cylinder when the air-operated valve is in the normally closed configuration and a second urging member mounted in the cylinder when the air-operated valve is in the normally open configuration, the first urging member having a larger urging force than the second urging member.

4. The air-operated valve according to claim 1, further comprising a blocking member in the air passage of the second piston rod in the normally open configuration.

* * * * *